United States Patent
Holopainen

(10) Patent No.: US 12,054,880 B2
(45) Date of Patent: Aug. 6, 2024

(54) PROCESS FOR PRODUCING FIBROUS MATERIAL WITH ANTIMICROBIAL PROPERTIES

(71) Applicant: Nordic Biotech Group Oy, Espoo (FI)

(72) Inventor: Kari Holopainen, Lahti (FI)

(73) Assignee: NORDIC BIOTECH GROUP OY, Helsinki (FI)

( * ) Notice: Subject to any disclaimer, the term of this patent is extended or adjusted under 35 U.S.C. 154(b) by 0 days.

(21) Appl. No.: 18/110,700

(22) Filed: Feb. 16, 2023

(65) Prior Publication Data

US 2023/0250578 A1    Aug. 10, 2023

Related U.S. Application Data

(60) Division of application No. 16/414,829, filed on May 17, 2019, now Pat. No. 11,598,047, which is a continuation of application No. PCT/FI2017/050790, filed on Nov. 16, 2017.

(30) Foreign Application Priority Data

Nov. 17, 2016    (FI) ..................... 20165868

(51) Int. Cl.
| | | |
|---|---|---|
| *D06M 15/17* | (2006.01) | |
| *A01N 25/34* | (2006.01) | |
| *A01N 37/08* | (2006.01) | |
| *A01N 65/06* | (2009.01) | |
| *D06M 15/70* | (2006.01) | |
| *D06M 16/00* | (2006.01) | |
| *D06M 23/10* | (2006.01) | |

(52) U.S. Cl.
CPC ............ *D06M 15/17* (2013.01); *A01N 65/06* (2013.01); *D06M 15/70* (2013.01); *D06M 16/00* (2013.01); *D06M 23/10* (2013.01); *A01N 25/34* (2013.01); *A01N 37/08* (2013.01); *D06M 2200/00* (2013.01); *D10B 2401/13* (2013.01)

(58) Field of Classification Search
CPC ...... D06M 15/17; D06M 15/70; D06M 16/00; D06M 23/10; D06M 2200/00; A01N 65/06; A01N 25/34; A01N 37/08; D10B 2401/13

See application file for complete search history.

(56) References Cited

U.S. PATENT DOCUMENTS

| | | | |
|---|---|---|---|
| 2,128,973 A | 9/1938 | Tilsdale et al. | |
| 6,908,962 B1* | 6/2005 | Frankenbach | D06M 15/647 |
| | | | 524/588 |
| 8,563,017 B2 | 10/2013 | Cunningham et al. | |
| 8,906,115 B2 | 12/2014 | Bender | |
| 2005/0084471 A1* | 4/2005 | Andrews | A23L 3/3517 |
| | | | 424/70.31 |
| 2005/0136100 A1 | 6/2005 | Foss | |
| 2007/0048345 A1 | 3/2007 | Huang et al. | |
| 2013/0115260 A1 | 5/2013 | Sipponen | |
| 2016/0194523 A1* | 7/2016 | Evdokimov | C09F 1/04 |
| | | | 530/218 |
| 2016/0249645 A1 | 9/2016 | Rintola et al. | |

FOREIGN PATENT DOCUMENTS

| | | | | |
|---|---|---|---|---|
| CN | 101642110 A | | 2/2010 | |
| CN | 106259335 A | | 1/2017 | |
| EP | 2102408 B1 | | 8/2013 | |
| JP | 2007-504826 A | | 3/2007 | |
| JP | 2011-520494 A | | 7/2011 | |
| JP | 2013-507347 A | | 3/2013 | |
| JP | 2018-066090 A | | 4/2018 | |
| KR | 10-2011-0016436 A | | 2/2011 | |
| WO | WO 2008/132720 A1 | | 11/2008 | |
| WO | WO 2011/042613 | * | 4/2011 | ............ A01N 37/08 |
| WO | WO 2011/042613 A2 | | 4/2011 | |
| WO | WO 2013/060936 | * | 5/2013 | ............ A01N 37/08 |
| WO | WO 2013/060936 A1 | | 5/2013 | |
| WO | WO 2016/116668 | * | 7/2016 | ............ A01N 25/04 |
| WO | WO 2016/116668 A1 | | 7/2016 | |

OTHER PUBLICATIONS

Dow chemical, TRITON™ RW-50 Surfactant, Mar. 11, 2022, https://www.dow.com/en-us/pdp.triton-rw-50-surfactant.94426z.html.
European Patent Office, Extended Search Report issued in corresponding Application No. 17872692.3, mailed Apr. 29, 2020, 12 pp.
Finnish Patent Office, International Search Report & Written Opinion issued in corresponding Application No. PCT/FI2017/050790, mailed Mar. 26, 2018, 14 pp.
Finnish Patent Office, Search Report issued in corresponding Application No. 20165868, mailed May 19, 2017, 1 pp.
Japanese Patent Office, Office Action issued in corresponding Application No. 2019-527152, mailed Feb. 1, 2022, 6 pp.
Japanese Patent Office, Office Action issued in corresponding Application No. 2019-527152, mailed Oct. 12, 2021, 9 pp.

(Continued)

*Primary Examiner* — Amina S Khan
(74) *Attorney, Agent, or Firm* — Birch, Stewart, Kolasch & Birch, LLP

(57) ABSTRACT

The application relates to a process for producing fibrous material with antimicrobial properties, wherein in the first step coniferous resin acid composition is emulsified into aqueous solution with emulsifier and wetting agent, and in the second step thus formed emulsion is transferred into fibrous material by impregnation. Further, the application relates to an aqueous antimicrobial composition for use as a water-soluble concentrate in the treatment of fibrous materials, and to a fibrous material with antimicrobial properties, and to its use in e.g. fabrics, fur, leather, clothes, canvas, tissues, plastics, webs, accessories, packaging materials, wallpapers, food-related products, household products, footwear, construction materials, insulating materials and medical products.

14 Claims, 8 Drawing Sheets

(56) References Cited

OTHER PUBLICATIONS

Korean Intellectual Property Office, Office Action issued in corresponding Application No. 10-2019-7016583 dated Sep. 29, 2021, 19 pp.
Perez-Mosqueda et al., "Development of eco-friendly submicron emulsions stabilized by a bio-derived gum", Colloids and Surfaces B: Biointerfaces, vol. 123, 2014, pp. 797-802.

* cited by examiner

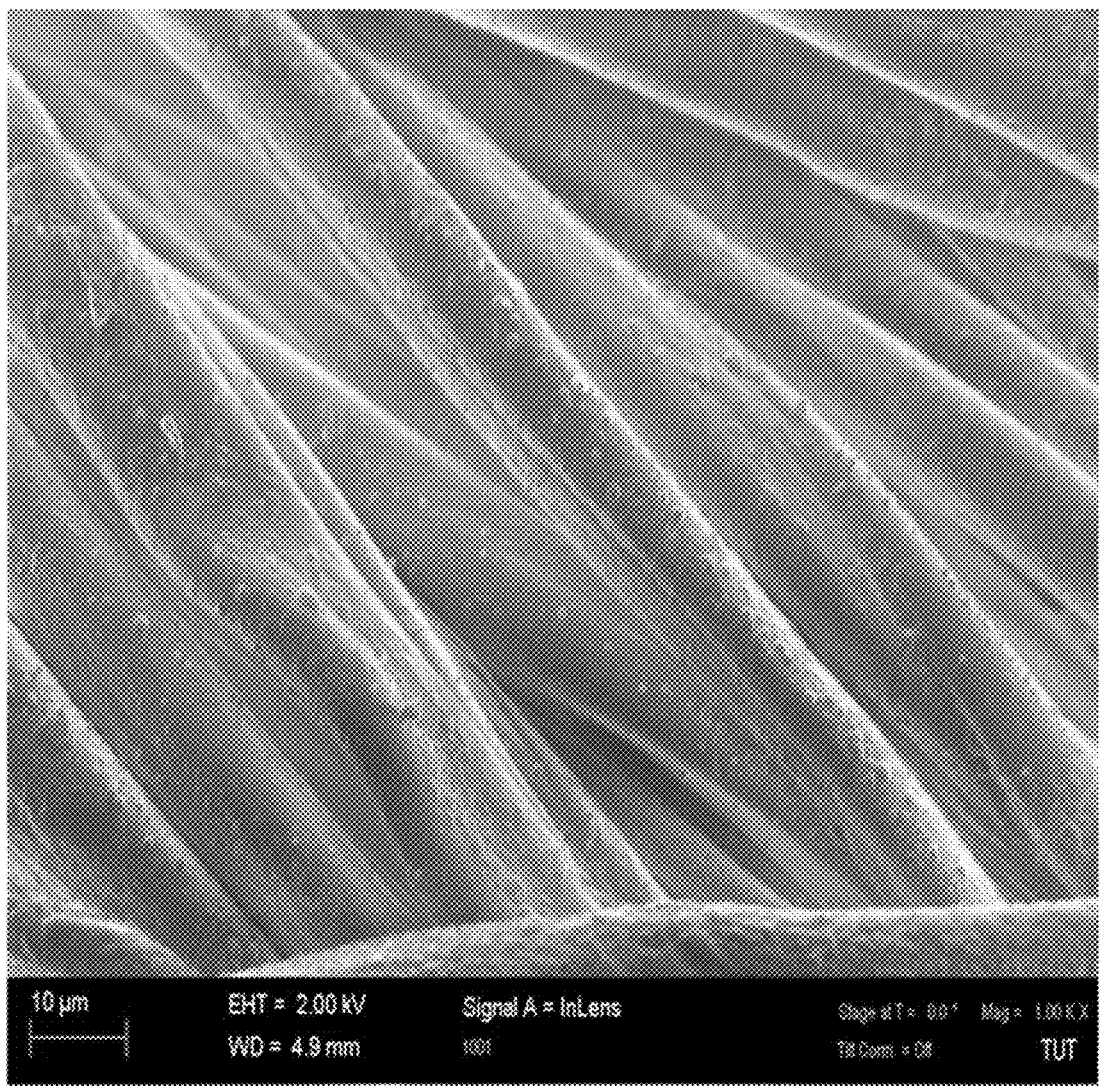
Figure [1]

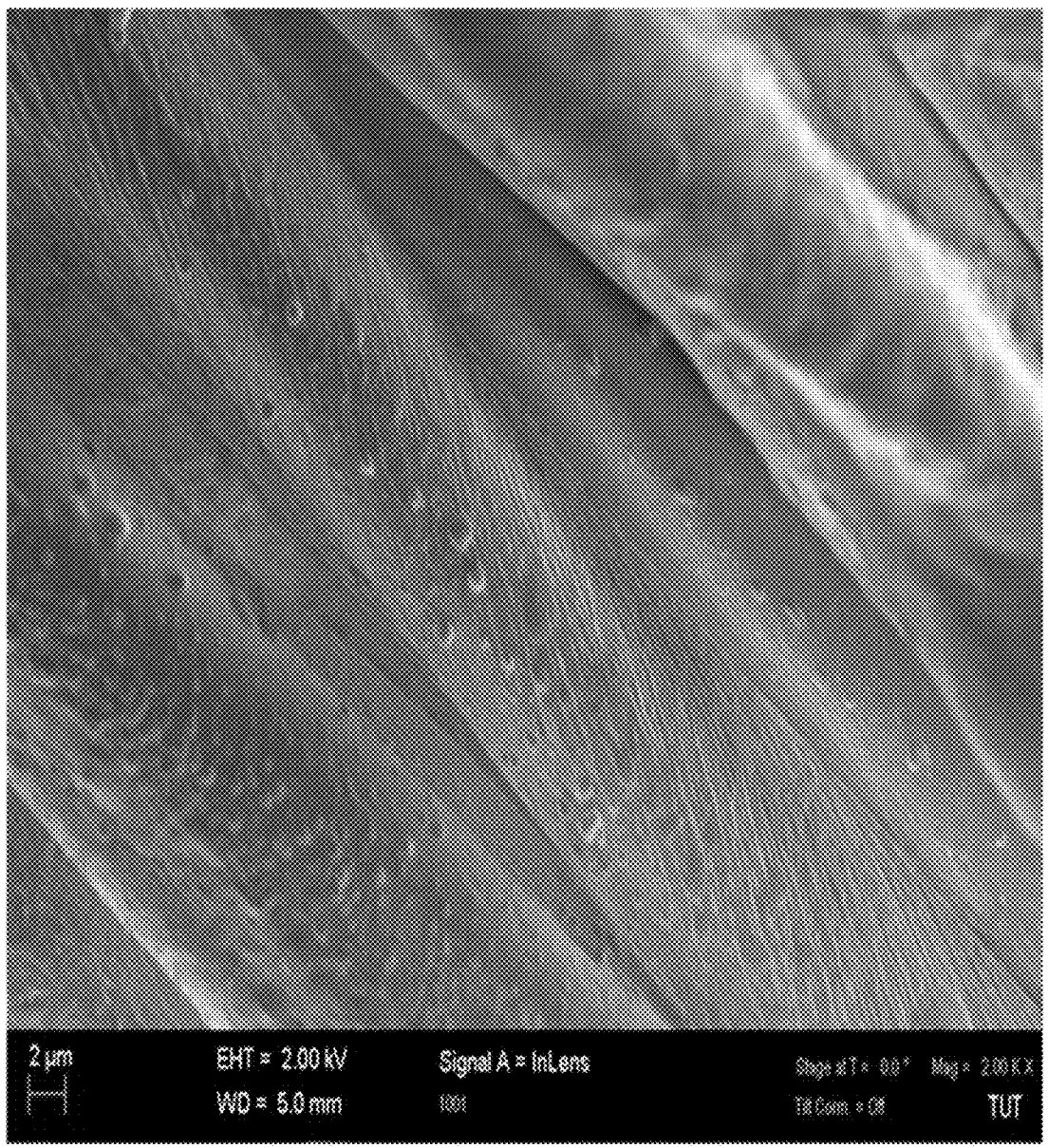
Figure [2]

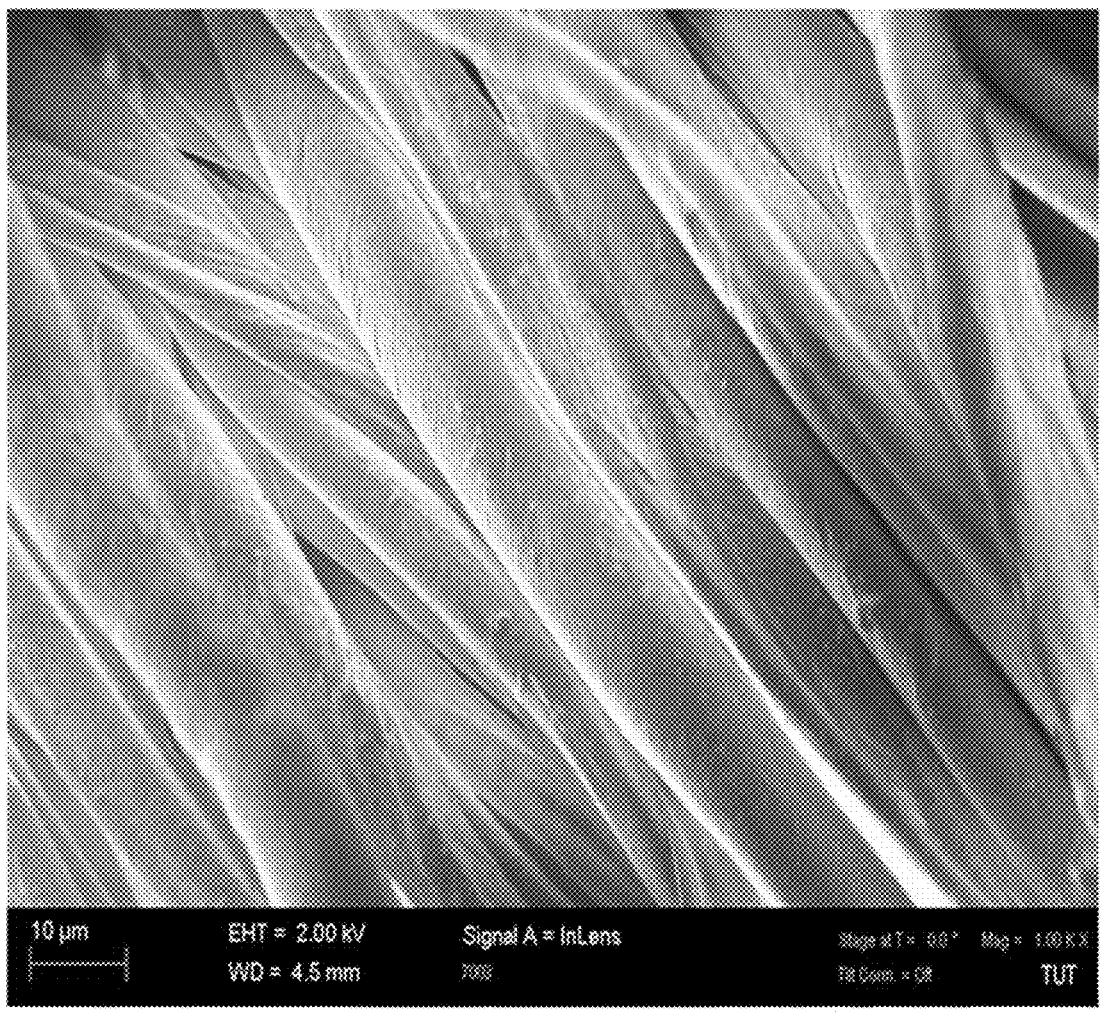
Figure [3]

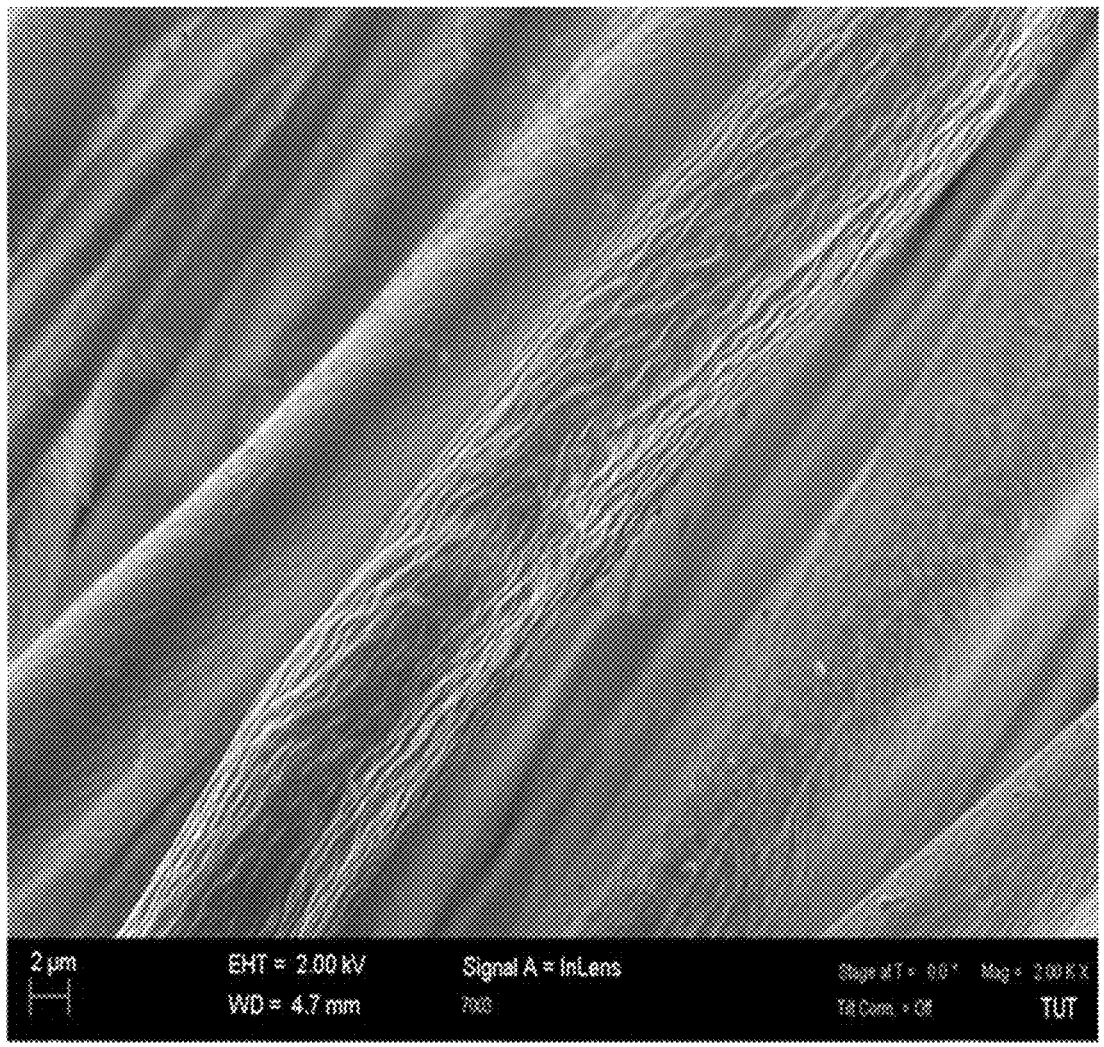
Figure [4]

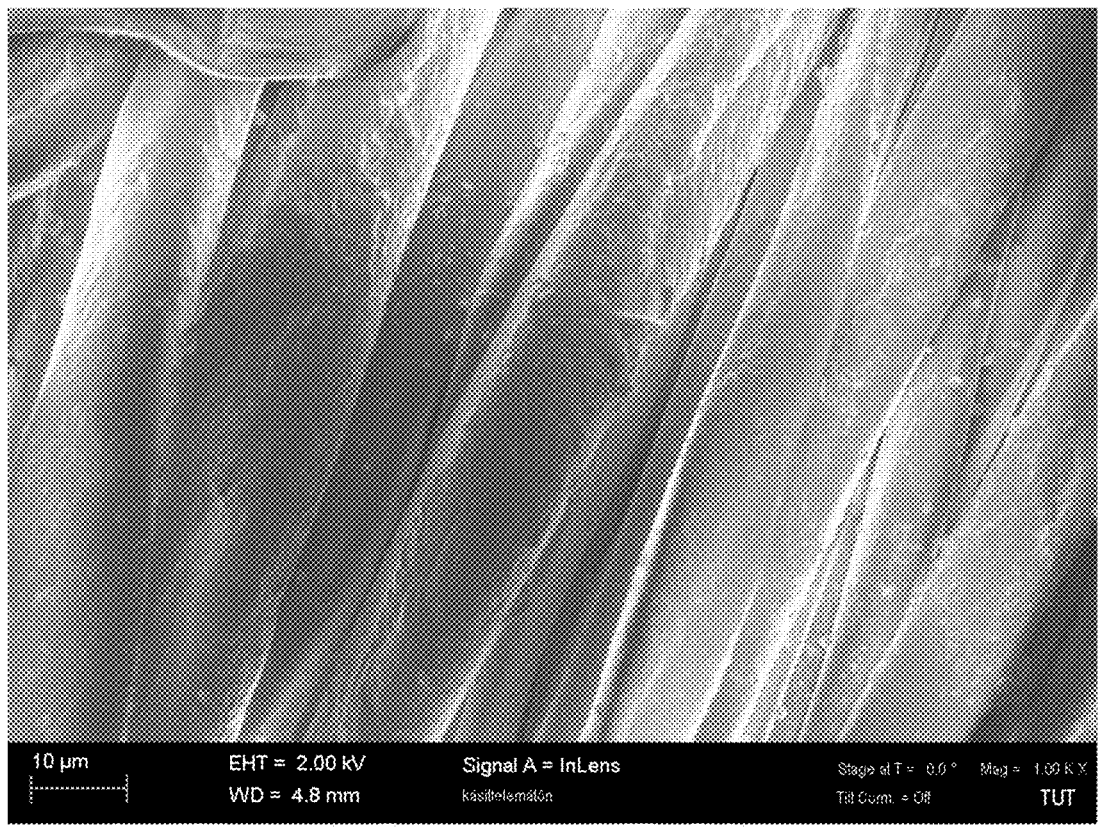
Figure [5]

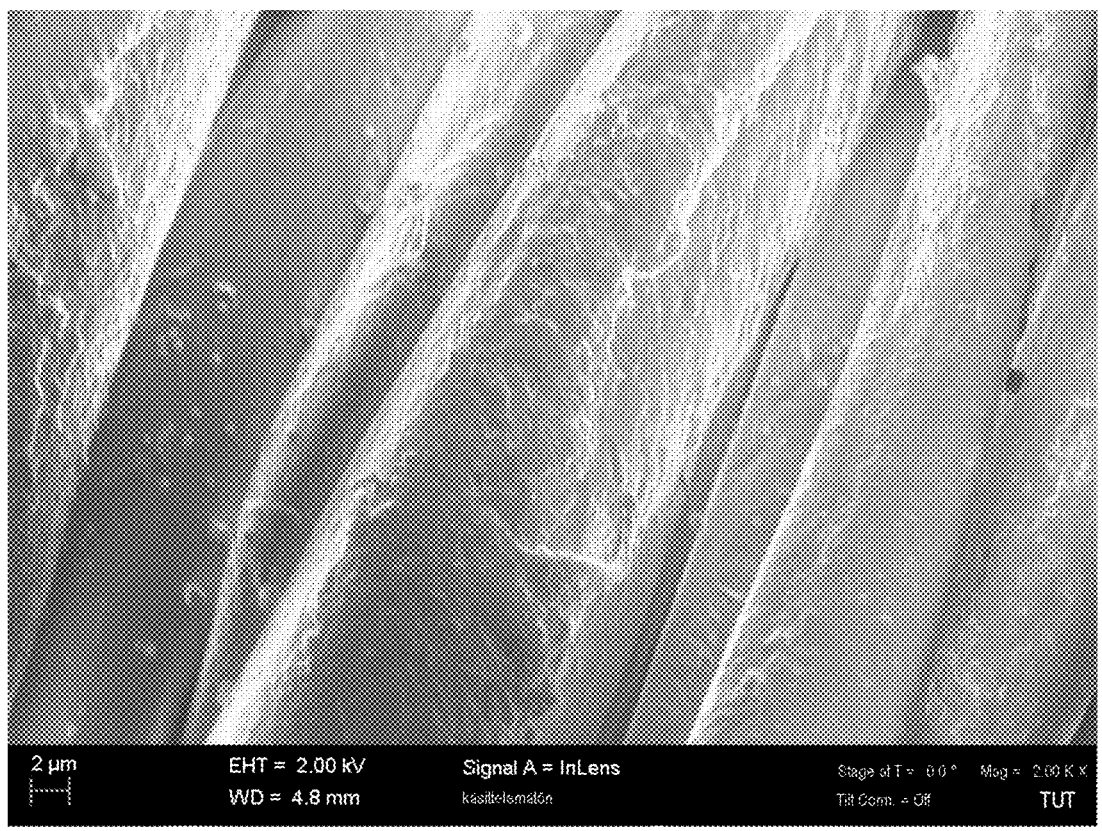
Figure [6]

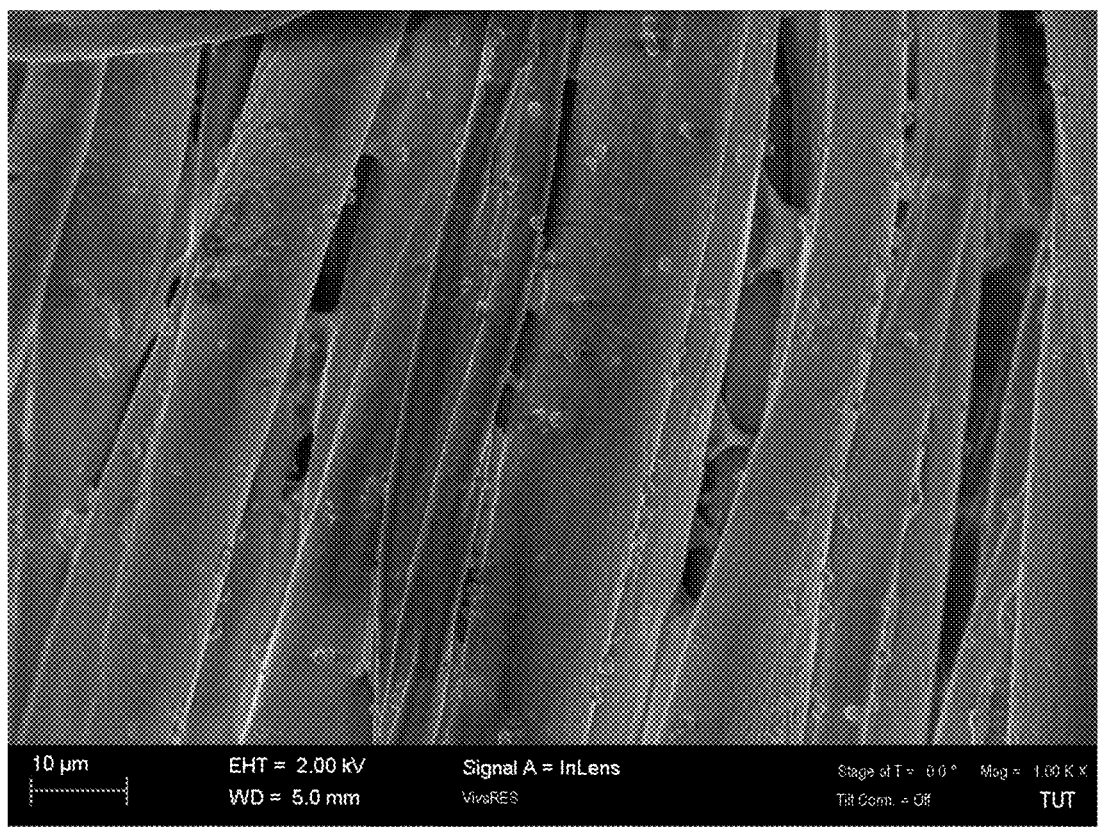
Figure [7]

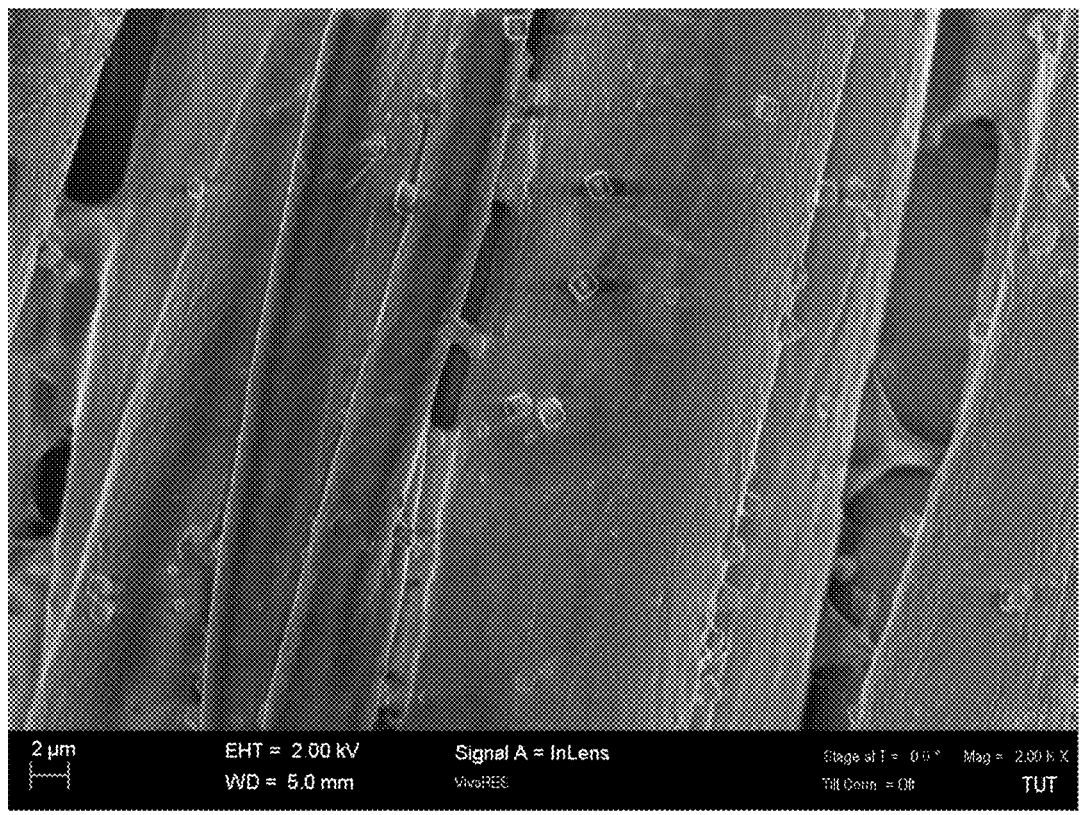
Figure [8]

PROCESS FOR PRODUCING FIBROUS MATERIAL WITH ANTIMICROBIAL PROPERTIES

This application is a Divisional of co-pending application Ser. No. 16/414,829, filed on May 17, 2019, now U.S. Pat. No. 11,598,047, which is a Continuation of International Application No. PCT/FI2017/050790, filed on Nov. 16, 2017, which claims the benefit under 35 U.S.C. § 119(a) to Finnish Patent Application No. 20165868, filed on Nov. 17, 2016, all of which are hereby expressly incorporated by reference into the present application.

FIELD OF THE DISCLOSURE

The present disclosure relates to a process for producing antimicrobial fibrous material such as fibre or fabric, and more particularly to fibrous materials with antimicrobial properties comprising coniferous resin acids. It further relates to fibrous material produced by the disclosed process and to the use of the fibrous material with antimicrobial properties.

BACKGROUND OF THE DISCLOSURE

Fibrous products, such as fabrics, typically have fibrous and porous structures that provide good growth medium for many bacteria, fungi and viruses. Most textiles have poor resistance to microorganisms, and therefore the antimicrobial finishing of fabrics is an economical way to prevent harm to the human body. Also, in countries where climate is favourable for bacterial growth due to the high humidity and temperature values fibrous products with antimicrobial properties are truly desired and needed.

Typically, the antimicrobial effect is obtained through the application of specific chemical products during the finishing stage of the fibrous product, or through the incorporation of these substances into chemical fibres during the spinning process. For example, sodium chlorite is an anti-mold agent that is commonly used in fibrous products, such as fabrics, for improving their storage stability. However, it has been classified as toxic, dangerous to the environment and harmful to health. Thus, fibrous products containing said chemical must be handled with care and the industry is constantly looking for alternative safer compounds to replace it.

At present, there are many kinds of fibrous products with antimicrobial properties on the market and many of those products utilise organic or inorganic particles as antimicrobial agents. For example, copper, silver, tin, and zinc are being used as antimicrobial agents because of their effective anti-microbial and/or antifungal properties. These compounds can be applied topically to the fibers or fabrics or into the fibers during manufacturing processes of the fibrous materials. Typically, the antimicrobial agent, such as silver, is incorporated into the fibrous material by boiling at relatively high temperatures, for example at 180° C. for 30 minutes.

US20050136100 discloses anti-microbial and/or anti-fungal synthetic hollow fibres and various products made partially or wholly therefrom that are formed in pure hollow or mock-hollow shapes and composed of various thermoplastic polymers having dispersed therein organic or inorganic, antimicrobial additives incorporated in carriers such as zirconium phosphate, zeolites, or dissolvable glass. Organic agents may include triclosan and/or other antimicrobial chemicals. The products are obtained by heating the fiber polymer, e.g. polyethylene terephthalate (PET), to between 180° and 230° Fahrenheit in hot water which allows further metal loading or ion exchange to replace resident metal ions with another ion or mixture of ions.

EP2102408 discloses method for the antimicrobial finishing of textiles or fibers which consist essentially of synthetic materials, in which an aqueous solution of an organic primer component, which increases the hydrophobicity of the surface of the textiles or fibers, and, as antimicrobial component, at least one organic quaternary ammonium compound and where the primer component consists of one or more of the following compounds: aromatic mono- or dicarboxylic acids, where these may also be substituted by hydroxy groups; aromatic mono- and diamines; aromatic mono- or dialcohols; aliphatic mono- or dicarboxylic acid having 6 to 26 carbon atoms, where these may also be substituted by hydroxy or amino groups; aliphatic, primary, secondary or tertiary amines having 6 to 26 carbon atoms; aliphatic, primary or secondary alcohols having 6 to 26 carbon atoms; aliphatic, primary mercaptans having 6 to 26 carbon atoms; amino acids, and a solvent are applied to the textiles or fibers at the same time or at a different time. Publication discloses also antimicrobial composition and its use for the antimicrobial finishing of textiles, fibers and yarns by means of padding processes, foam application, spray processes, coating or extraction method.

One of the disadvantages of some of the prior art is that typically anti-microbial additives are applied topically to the fibers or fabrics and tend to wash off or wear off over time and become ineffective. Also, by washing off the additives are placed into the waste water stream. Moreover, as the antimicrobial additives are released from fibers, such as textiles, they can cause allergic reactions or irritation to the skin. On the other hand, when the antimicrobial additives, such as silver, are applied into the fibers already during the manufacturing process the fibers tend to lose or diminish some of their quality characteristics, such as breathability and smoothness.

Thus, a need exists for antimicrobial (antibacterial, antiviral and/or antifungal) fibers that maintain their anti-microbial effectiveness even after repeated uses and provide excellent texture, smoothness and wearability.

BRIEF DESCRIPTION OF THE DISCLOSURE

An object of the present disclosure is to provide a process for producing fibrous material with antimicrobial properties in order to overcome the above problems. Another object of the present disclosure is to provide a fibrous product with antimicrobial properties, and an aqueous antimicrobial composition for use in the process for producing fibrous material with antimicrobial properties.

The objects of the disclosure are achieved by a process, a product produced by the process and use of the thus produced product which are characterized by what is stated in the independent claims. The preferred embodiments of the disclosure are disclosed in the dependent claims.

The disclosure is based on the idea of producing a fibrous material with antimicrobial properties by first emulsifying coniferous resin acid composition into aqueous solution with emulsifier, thereafter transferring thus formed emulsion into fibrous material by impregnation and optionally after-treating the fibrous material to form a finished product.

An advantage of the process of the disclosure is that by the novel process it is possible to produce fibrous material with long-lasting antimicrobial properties. Also, another advantage of the process of the disclosure is that by the novel process it is possible to produce fibrous material with antimicrobial properties that is not harmful to the environment or animals including humans. Still, another advantage of the process of the disclosure is that the process is simple and time-saving, because high temperatures and long processing times are not needed. Further, another advantage of the process of the disclosure is that with the process it is possible to manufacture fibrous products that can be stored and transported in various environments without rotting, deteriorating or causing any harm to animals including humans.

Still, another advantage of the process of the disclosure is that by the novel process it is possible to produce fibrous material with antimicrobial properties that can be used in various medical applications. The fibrous material with antimicrobial properties is suitable for use for example in surgical yarns, in which case for example a wound can be sewed with the fibrous material with antimicrobial properties and the said non-toxic antimicrobial yarn can melt into the wound and thus prevent infections.

Furthermore, an advantage of the process of the disclosure is that by the novel process it is possible to produce fibrous material that can be further processed. For example, the fibrous material with antimicrobial properties produced by the novel process is easy to handle and it can easily be dyed and processed. This is considered as an advantage, because some commonly used antimicrobial agents, like quaternary ammonium compounds, may adversely affect the dyeing ability of the fibrous products.

More specifically, the process according to the invention is characterized by what is stated in the independent claim 1.

A fibrous material with antimicrobial properties obtainable by the process according to the invention is characterized by what is stated in the independent claim 14.

An aqueous antimicrobial composition for use as a water-soluble concentrate in the treatment of fibrous materials is characterized by what is stated in the independent claim 18.

The use of the fibrous material with antimicrobial properties produced by the process according to the invention is characterized by what is stated in the independent claim 24.

BRIEF DESCRIPTION OF THE DRAWINGS

FIGS. 1 and 2 are electron micrographs showing a fibrous material treated with an alcohol solution of coniferous resin acids. The solution comprised about 70% ethanol and about 1% of coniferous resin acids. The fibrous material was fabric, and following impregnation said fabric was properly dried until completely dry.

FIGS. 3 and 4 are electron micrographs showing the same fibrous material as in FIGS. 1 and 2, but instead it was impregnated in the aqueous coniferous resin acid emulsion according to the invention. Said coniferous resin acid emulsion comprised the same amount of resin acids as the alcoholic solution, i.e. about 1% of coniferous resin acids.

FIGS. 3 and 4 show an evenly distributed and smooth molecular net of coniferous resin acids on the fibrous material covering the fibres.

FIGS. 5 and 6 are electron micrographs showing the same fibrous original material as in FIGS. 1-4, but the fibrous material was untreated.

FIGS. 7 and 8 are electron micrographs showing the same fibrous original material as in FIGS. 1-6, but instead it was impregnated in the aqueous coniferous resin acid dispersion (wound spray from Repolar Pharmaceuticals) with the brand name AniDes® comprising aqua, glycerin, Propanediol, Caprylic/Capric triglyceride, Norway Spruce (*Picea abies*) resin extract, Sorbitan laureate, Polyglycerol laureate, Dilauryl citrate, Xanthan gum, Potassium sorbate, Denatomium benzoate, Sodium hydroxide. Following impregnation said fibrous material was properly dried.

DETAILED DESCRIPTION OF THE DISCLOSURE

The disclosure is based on the idea of producing fibrous material with antimicrobial properties by first emulsifying coniferous resin/rosin acid composition into aqueous solution with emulsifier, thereafter transferring thus formed emulsion into fibrous material by impregnation and optionally after-treating the fibrous material to form a finished product.

The disclosure relates to a process for producing fibrous material with antimicrobial properties comprising the following steps:
I) emulsifying coniferous resin acid composition into aqueous solution with emulsifier and wetting agent,
II) transferring the thus formed emulsion into fibrous material by impregnation.

In a first embodiment, the process for producing fibrous material with antimicrobial properties comprises the following steps:
I) emulsifying coniferous resin acid composition into aqueous solution with emulsifier serving also as wetting agent,
II) transferring the thus formed emulsion into fibrous material by impregnation,
III) after-treating the impregnated fibrous material,
wherein in step I) a water-soluble concentrate of coniferous resin acid composition is prepared by mixing coniferous resin acid composition with a suitable solvent and aqueous emulsifier solution; in step II) thus formed emulsion is transferred into fibrous material by impregnation and thereafter dried; in step III) the fibrous material is after-treated by washing and/or drying.

Still, according to the first embodiment the process for producing fibrous material with antimicrobial properties is carried out in three steps, wherein in step I) coniferous resin acid composition is emulsified into aqueous solution with emulsifier and wetting agent by first preparing a water soluble concentrate of coniferous resin acid composition by mixing coniferous resin acid composition with a suitable solvent, and in parallel providing an aqueous solution of emulsifier serving also as wetting agent, then mixing the coniferous resin acid composition and emulsifier solutions to obtain a water-soluble concentrate; in step II) thus formed emulsion is transferred into fibrous material by impregnation by first preparing stable aqueous working solution of water soluble concentrate by diluting with water in varying ratios and then dipping fibrous material into the working solution until completely wet and thereafter drying the fibrous material to ensure complete removal of the solvent; in step III) the fibrous material is after-treated to form a finished product by washing the dried fibrous material with water until no foam occurs, and then optionally drying the washed fibrous material until dry.

In a second embodiment, the process for producing fibrous material with antimicrobial properties is carried out in two steps, wherein in step I) coniferous resin acid composition is emulsified into aqueous solution with emulsifier and wetting agent by first preparing a water-soluble concentrate of coniferous resin acid composition by mixing coniferous resin acid composition with a suitable solvent, then optionally adding and mixing pH regulator, following adding and mixing emulsifier and finally adding and mixing wetting agent until air bubbles are removed, and then usually gradually adding and mixing distilled water; in step II) thus formed emulsion is transferred into fibrous material by impregnation by first preparing stable aqueous working solution of water soluble concentrate by diluting with water in ratios of for example 1:200 and higher and then impregnating fibrous material into the working solution until completely wet and thereafter optionally drying the fibrous material to ensure complete removal of the solvent.

In the second embodiment after-treatment of the fibrous material comprising coniferous resin acids is not necessary. The fibrous material with antimicrobial properties does not need to be washed and(or) dried, because the amount of solvent and emulsifier are small enough not to affect the properties of the product. Thus, the process for producing fibrous material with antimicrobial properties does not comprise any after-treatment, such as washing and/or drying, to obtain the product fibrous material with antimicrobial properties.

According to another embodiment, the process for producing fibrous material with antimicrobial properties is carried out in two steps, wherein in step I) coniferous resin acid composition is emulsified into aqueous solution with emulsifier and wetting agent by first preparing a water soluble concentrate of coniferous resin acid composition by mixing coniferous resin acid composition with a suitable solvent, and in parallel preparing an aqueous solution of emulsifier and wetting agent, then mixing the coniferous resin acid composition and emulsifier solutions to obtain a water-soluble concentrate; in step II) thus formed emulsion is transferred into fibrous material by impregnation by first preparing stable aqueous working solution of water soluble concentrate by diluting with water in varying ratios and then impregnating fibrous material into the working solution until completely wet and thereafter drying the fibrous material to ensure complete removal of the solvent; in step III) the fibrous material is after-treated to form a finished product by washing the fully dried fibrous material with water until no foam occurs, and then drying the washed fibrous material until completely dry.

In an embodiment, the emulsifier serves also as wetting agent.

The term "fibrous material" means here fibrous material that is selected from animal, plant, mineral or synthetic fibres and/or mixtures thereof. Thus, the fibrous material may be selected from synthetic fibres selected from group consisting of thread, pulp, paper, carbon fibre (composite materials), viscose fibre, nylon, cupro, polyester, kevlar, elastane, rayon, glass fibre, metallic fibre, vinyon, saran, spandex, vinalon, aramids, modal, dyneema/spectra, PBI (polybenzimidazole fiber), acetate, cellophane, polyolefin, acrylic and polyester and/or mixtures thereof, or from animal fibres selected from group consisting of silk, wool, alpaca, qiviut, merino, angora, cashmere, bison, vicuna, yak down, alpaca (Huacaya), camel down, guanaco, llama (Tapada), chinchilla, mohair, llama (Ccara), or from plant fibres selected from group consisting of cotton, linen, kapok, flax, hemp, sisal, jute, kenaf, bamboo and coconut, sansevieria, fique, banana, agave, flax, jute, kenaf, ramie, rattan, vine, wheat, rice, barley, and other crops including grass and wood fibers and/or mixtures thereof, or from mineral fibres selected from group consisting of glass wool, stone wool, slag wool and ceramic fiber and/or mixtures thereof. Thus, the fibrous material can be fibres as such or fibrous product, for example fabric.

The term "emulsion" means here smooth and steady solution that differs from dispersion in that emulsion is stable and smooth, whereas dispersion contains larger molecules.

The term "impregnation" means here transferring the emulsion into fibrous material by impregnation, immersion, spraying, coating, dipping and/or during air or wet laid web formation. Coating can be performed by knife coating (floating knife) or direct coating, direct roll coating, pad-dry-cure, calender coating, hot melt extrusion coating and/or foam finishing.

Thus, impregnation can be performed by impregnation, immersion, spraying, coating, dipping and/or during air or wet laid web formation.

The term "molecular net" means here the net formed on the treated surface and/or within its pores. The molecular net can act as a bioactive molecular net and as a physical barrier. The bioactive molecular net provides antimicrobial properties by immobilizing microbes and preventing their spread to surrounding areas.

In an embodiment, the fibrous material is cotton or polyester. In another embodiment, the fibrous material is a mixture of cotton and polyester. Still in another preferable embodiment the fibrous material is a mixture of cotton, polyester and spandex.

In an embodiment, the fibrous material is silk. In another embodiment, the fibrous material is poly(tetrafluoroethylene) (PTFE). Still, in an embodiment, the fibrous material is poly(vinylidene fluoride) or polyvinylidene difluoride (PVDF). Fibrous material consisting of PVDF is particularly suitable for use as suture material and/or surgical mesh.

In an embodiment, the fibrous material is PGA or PLLA and/or mixtures thereof.

The fibrous material may be woven or non-woven.

Further, according to an embodiment the fibrous material is suture material, such as degradable biological suture material such as collagen based materials, catgut, or non-degradable biopolymers such as silk or cellulose (cotton). In an embodiment, the fibrous material is synthetic resorbable material such as poly(glycolic acid) (PGA) and/or poly(L-lactic acid) (PLLA).

In an embodiment, the fibrous material can be any fibrous material suitable for use in medical products, devices and applications. Thus, in an embodiment the fibrous material is selected from fibrous materials suitable for use in wound dressings, suture materials, surgical meshes and/or orthopaedic implants.

Coniferous resin acid composition means here resin/rosin acids obtained from fraction distillation of crude tall oil, which is derived from kraft pulping processes of coniferous trees.

The term "coniferous resin acid composition" is meant to include coniferous resin acids derived from a natural source, like rosin such as spruce resin, and a fraction of resin acids obtained by distilling crude tall oil derived from kraft pulping process of wood. Particularly preferably the coniferous resin acid composition includes at least the following coniferous resin acids: pimaric acid, sandaracopimaric acid, dihydroabietics acids, levopimaric acid, palustric acid, isopimaric acid, 8,12-abietic acid, abietic acid, dehydroabietic acid, neoabietic acid, dehydrodehydro abietic acid. Thus, the term "coniferous resin acid composition" has the same meaning as the term "coniferous rosin acid composition". In an embodiment, the coniferous resin acids are obtained as a distillation fraction from distilling of crude tall oil.

In an embodiment, the coniferous resin acid composition comprises coniferous resin acids in at least the following ratios: palustric acid to pimaric acid 0.9:1, palustric acid to abietic acid 1:6, palustric acid to dehydroabietic acid 1:0.8, dehydroabietic acid to abietic acid 1:8, neoabietic acid to abietic acid 1:7, neoabietic acid to palustric acid 0.9:1, pimaric acid to abietic acid 1:7.

In another embodiment, the coniferous resin acid composition comprises coniferous resin acids in at least the following ratios: palustric acid to pimaric acid 1.9:1, palustric acid to abietic acid 1:4.9, palustric acid to dehydroabietic acid 1:2.7, dehydroabietic acid to abietic acid 1:1.8, neoabietic acid to abietic acid 1:11, neoabietic acid to palustric acid 1:2.2, pimaric acid to abietic acid 1:9.4.

According to an embodiment the coniferous resin acid composition comprises pimaric acid, sandaracopimaric acid, dihydroabietics acids, levopimaric acid, palustric acid, isopimaric acid, 8,12-abietic acid, abietic acid, dehydroabietic acid, neoabietic acid, dehydrodehydro abietic acid and minor amounts of other resin acids.

In an embodiment, the coniferous resin acid composition comprises the following rosin/resin acid composition: 40-50 w-% of abietic acid, 0.5-1 w-% of 8,12-abietic acid, 6-7 w-% of pimaric acid, 1-2 w-% of sandaracopimaric acid, 1-1.5 w-% of dihydroabietics acid (group), 0-0.5 w-% of levopimaric acid, 6.5-7.5 w-% of palustric acid, 6-7 w-% of neoabietic acid, 5-6 w-% of dehydroabietic acid, 0.5-1.5 w-% of isopimaric acid, and minor amounts of other resin acids. In an embodiment, the amount of palustric acid is at least 6 w-% of the rosin/resin acid composition, preferably from 6 to 10 w-%, more preferably from 7 to 8 w-%.

In another embodiment, the coniferous resin acid composition comprises the following rosin/resin acid composition: 30-40 w-% of abietic acid, 1-2 w-% of 8,12-abietic acid, 2-5 w-% of pimaric acid, 2-3 w-% of sandaracopimaric acid, 1.2-1.5 w-% of dihydroabietics acid (group), 0-0.1 w-% of levopimaric acid, 6.7-7.5 w-% of palustric acid, 3-4 w-% of neoabietic acid, 18-20.5 w-% of dehydroabietic acid, 2-4 w-% of isopimaric acid, and minor amounts of other resin acids. In an embodiment, the coniferous resin acid composition comprises 5-7 w-% of unknown rosin acids. In an embodiment, the amount of palustric acid is at least 6.5 w-% of the resin/rosin acid composition, preferably from 7 to 10 w-%, more preferably from 7 to 9 w-%.

In an embodiment, the coniferous resin acid composition comprises from 2 to 5%, preferably from 3 to 4% of unsaponifiable matter.

The acid value of the coniferous resin acid composition is typically from 160 to 180 mg KOH/g, typically about 170 mg KOH/g.

The melting point of the coniferous resin acid composition is typically from 62° C. to 95° C. The fire/flash point of the coniferous resin acid composition is typically from 180° C. to 225° C. The amount of the coniferous resin acids in the coniferous resin acid composition is typically from 70 to 90 wt-%, preferably from 70 to 80 wt-%. The coniferous resin acid composition comprises typically >90 wt-%, preferably >95 w-% of free resin/rosin acids.

The coniferous resin acid composition is typically added into the aqueous solution in an amount of 0.4 to 4 w-%, preferably in an amount of 0.5 to 3 W-%, particularly preferably in an amount of 1 to 2 w-%.

According to an embodiment of the disclosure the emulsifier is selected from cationic, anionic and non-ionic emulsifiers and/or mixtures thereof.

In an embodiment, the emulsifier is selected from aliphatic amines group, wherein the degree of ethoxylation is ranging from 2 to 15 moles. In an embodiment, the emulsifier is amine ethoxylate.

In another embodiment, the emulsifier is selected from alpha olefins having a low tackiness residual and outstanding wetting properties, preferably from C10-C18 alpha olefins, particularly preferably from C12-C16 alpha olefins. Still, in an embodiment the emulsifier is C14/16-alpha olefin sulphonate sodium salt.

In an embodiment, a water-soluble concentrate of the coniferous resin acid composition is prepared by mixing said coniferous resin acid composition in a suitable solvent with an emulsifier and wetting agent and further diluting said water-soluble concentrate into aqueous solutions in ratios of up to 1:200.

In the first embodiment, the amount of emulsifier is from 30 to 70 w-%, preferably from 40 to 60 w-%, more preferably from 50 to 55 w-% of the water-soluble concentrate.

In the second embodiment, the amount of emulsifier is from 0.5 to 5 w-%, preferably from 1 to 3 w-%, more preferably from 1 to 2 w-% of the water-soluble concentrate.

In an embodiment, the water-soluble concentrate of the coniferous resin acid composition comprises coniferous resin acids in an amount of about 4000 ppm to about 40000 ppm, preferably about 5000 ppm to about 30000 ppm, particularly preferably in an amount of 10000 ppm to 20000 ppm. Still in an embodiment, the water-soluble concentrate is diluted into aqueous solutions in ratios of 1:300, preferably in ratios of 1:200, more preferably in ratios of 1:100.

In an embodiment, the water-soluble concentrate is an aqueous antimicrobial composition for use as a water-soluble concentrate in the treatment of fibrous materials. In an embodiment, said antimicrobial composition comprises coniferous resin acids, solvent, emulsifier and water.

The aqueous antimicrobial composition for use as a water-soluble concentrate in the treatment of fibrous material does not comprise polyvalent alcohols, polyhydric alicyclic alcohols or polyhydric aliphatic alcohols.

In another embodiment, the aqueous antimicrobial composition further comprises pH regulator and wetting agent.

Still, in an embodiment the aqueous antimicrobial composition comprises wetting agent selected from amine oxides, particularly preferably from C10-C16 alkyl dimethyl amine oxides.

In an embodiment the aqueous antimicrobial composition comprises an emulsifier selected from ethoxylated aliphatic amines, wherein the degree of ethoxylation is ranging from 2 to 15 moles, preferably the emulsifier is amine ethoxylate with coco base, oleic base, soya base or tallow base.

In an embodiment, the aqueous antimicrobial composition comprises a wetting agent selected from amine oxides, particularly preferably from C10-C16 alkyl dimethyl amine oxides, and emulsifier selected from ethoxylated aliphatic amines, wherein the degree of ethoxylation is ranging from 2 to 15 moles, preferably the emulsifier is amine ethoxylate with coco base, oleic base, soya base or tallow base, and solvent is isopropanol.

In an embodiment, an aqueous antimicrobial composition comprises pH regulator selected from ethanolamine, diethanolamine and triethanolamine and/or mixtures thereof.

Still, in an embodiment, the antimicrobial composition comprises isopropanol as solvent.

In another embodiment, the antimicrobial composition comprises solvent selected from E-series glycol ethers such as ethylene glycol monomethyl ether (2-methoxyethanol), ethylene glycol monoethyl ether (2-ethoxyethanol), ethylene glycol monopropyl ether (2-propoxyethanol), ethylene glycol monoisopropyl ether (2-isopropoxyethanol), ethylene glycol monobutyl ether (2-butoxyethanol), ethylene glycol monophenyl ether (2-phenoxyethanol), ethylene glycol monobenzyl ether (2-benzyloxyethanol), diethylene glycol monomethyl ether (2-(2-methoxyethoxy)ethanol, (methyl carbitol), diethylene glycol monoethyl ether (2-(2-ethoxyethoxy)ethanol, carbitol cellosolve), diethylene glycol mono-n-butyl ether (2-(2-butoxyethoxy)ethanol, butyl carbitol), and P-series glycol ethers such as dipropylene glycol methyl ether, dipropylene glycol methyl ether acetate, dipropylene glycol n-butyl ether, dipropylene glycol n-propyl ether, propylene glycol diacetate, propylene glycol methyl ether, propylene glycol methyl ether acetate, propylene glycol n-butyl ether, propylene glycol n-propyl ether, propylene glycol phenyl ether, tripropylene glycol methyl ether, tripropylene glycol n-butyl ether or dipropylene glycol dimethyl ether and/or mixtures thereof, and emulsifier selected from alpha olefins having a low tackiness residual and outstanding wetting properties, preferably from C10-C18 alpha olefins, particularly preferably from C12-C16 alpha olefins.

The wetting agent is typically selected from amine oxides, particularly preferably from C10-C16 alkyl dimethyl amine oxides. In an embodiment the wetting agent is selected from alkyl dimethyl amine oxides of varying chain lengths, preferably from amines N,N-dimethyl-1-Dodecanamine N-oxide (C12 amine oxide), N,N-dimethyl-tetra decan amine N-oxide (C14 amine oxide), C10-16-alkyldimethyl Amines N-oxides (C10-16 amine oxides), C12-C16-alkyl dimethyl N-Oxides, coco dimethyl amine oxide, lauryl dimethyl amine oxide, tallow amine oxide. In an embodiment, the wetting agent is selected from long-chain C10-C16 alkyl amine oxides, because long chain length stabilizes and lowers the inherent foaming properties of the amine oxides.

In the second embodiment, the amount of the wetting agent is from 5 to 20 w-%, preferably from 6 to 15 w-%, more preferably from 9 to 12 w-% of the water-soluble concentrate.

In an embodiment the aqueous solution obtained in step I) is transferred into textiles/fibres by impregnation in a suitable solvent selected from P-series glycol ethers such as dipropylene glycol methyl ether, dipropylene glycol methyl ether acetate, dipropylene glycol n-butyl ether, dipropylene glycol n-propyl ether, propylene glycol diacetate, propylene glycol methyl ether, propylene glycol methyl ether acetate, propylene glycol n-butyl ether, propylene glycol n-propyl ether, propylene glycol phenyl ether, tripropylene glycol methyl ether, tripropylene glycol n-butyl ether or dipropylene glycol dimethyl ether and/or mixtures thereof.

According to an embodiment in step I) the coniferous resin acid composition is first dissolved in solvent selected from E-series glycol ethers such as ethylene glycol monomethyl ether (2-methoxyethanol), ethylene glycol monoethyl ether (2-ethoxyethanol), ethylene glycol monopropyl ether (2-propoxyethanol, ethylene glycol monoisopropyl ether (2-isopropoxyethanol), ethylene glycol monobutyl ether (2-butoxyethanol), ethylene glycol monophenyl ether (2-phenoxyethanol), ethylene glycol monobenzyl ether (2-benzyloxyethanol), diethylene glycol monomethyl ether (2-(2-methoxyethoxy)ethanol, (methyl carbitol), diethylene glycol monoethyl ether (2-(2-ethoxyethoxy)ethanol, carbitol cellosolve), diethylene glycol mono-n-butyl ether (2-(2-butoxyethoxy)ethanol, butyl carbitol), and P-series glycol ethers such as dipropylene glycol methyl ether, dipropylene glycol methyl ether acetate, dipropylene glycol n-butyl ether, dipropylene glycol n-propyl ether, propylene glycol diacetate, propylene glycol methyl ether, propylene glycol methyl ether acetate, propylene glycol n-butyl ether, propylene glycol n-propyl ether, propylene glycol phenyl ether, tripropylene glycol methyl ether, tripropylene glycol n-butyl ether or dipropylene glycol dimethyl ether and/or mixtures thereof.

In the first embodiment, in step I) the solvent is selected from E-series and P-series glycol ethers and/or mixtures thereof, and the amount of the solvent is preferably from 10 w-% to 30 w-%, more preferably from 15 w-% to 20 w-%, still more preferably from 17 to 19 w-% of the water-soluble concentrate.

According to an embodiment in step I) the coniferous resin acid composition is first dissolved in isopropanol. In an embodiment, the amount of isopropanol is preferably from 8 to 15 w-%, more preferably from 10 to 13 w-% of the water-soluble concentrate.

In the second embodiment, in step I) of the process the coniferous resin acid composition cannot be first dissolved in ethanol, because with ethanol the resulting solution is turbid and unstable.

In an embodiment, in step I) the coniferous resin acid composition is emulsified into aqueous solution with emulsifier and wetting agent, and the pH regulator is selected from compounds suitable for use in after-treatment of fibrous products. Preferably the pH regulator is selected from ethanolamine, diethanolamine and triethanolamine. Preferably the amount of pH regulator is from 0.3 to 1 w-%, more preferably from 0.4 to 0.6 w-% of the water-soluble concentrate.

In the first embodiment, the amount of added water is preferably from 15 w-% to 40 w-%, more preferably from 20 to 35 w-%, still more preferably from 25 to 30 w-% of the water-soluble concentrate.

In the second embodiment, the amount of added water is preferably from 60 w-% to 90 w-%, more preferably from 70 to 80 w-% of the water-soluble concentrate.

In step II) of the process transferring emulsion obtained from step I) into fibrous material by impregnation is carried out in a suitable solvent for a time sufficient to enable adhesion of the antimicrobial agent into fibrous material, preferably for 1 to 180 seconds, more preferably for 1 to 20 seconds, particularly preferably for 2 to 3 seconds. In an embodiment, in step II) the impregnation is performed in a suitable solvent for a time sufficient to enable adhesion of the antimicrobial agent into fibrous material, preferably less than 180 seconds, more preferably for 10 to 120 seconds, most preferably for 2 to 3 seconds.

In the first embodiment, in step III) of the process the after-treatment is carried out by evaporating the solvent by drying the fibrous material at ambient temperature or preferably at 20 to 180° C. for 1 to 120 minutes, more preferably at 20 to 80° C. for 10 to 120 minutes or until dry, and washing the fibrous material with water to remove the emulsifier. Still, in another embodiment, in step III) of the process the after-treatment is carried out by evaporating the impregnation solvent by heating the fibrous material at 37° C. for 120 minutes or until dry.

According to an embodiment the emulsifier is removed by washing the fibrous material typically with water.

In an embodiment, the emulsifier is removed by washing the fibrous material with detergent. In another embodiment, the emulsifier is removed by washing the fibrous material with water and/or an aqueous detergent solution.

In an embodiment, in step II) of the process impregnation means application of coniferous resin acid composition during the finishing stage of the fibrous product, or through the incorporation of these substances into fibres during spinning process. In an embodiment, in step II) of the process the fibrous material means fibrous material, such as feedstock of fibrous material, that can be further processed into fibrous products. In another embodiment, in step II) of the process impregnation means application of coniferous resin/rosin acid composition before the finishing stage of the fibrous product.

In the different embodiments, the treatment of the fibrous material by aqueous resin acid composition is performed by impregnation, impregnation, immersion, spraying, coating, dipping and/or during air or wet laid web formation. By impregnation, a bioactive molecular net is formed on the fibrous material and within its pores, the molecular net covering the entire fibre.

The disclosure also relates to fibrous material with antimicrobial properties wherein the fibrous material with antimicrobial properties is obtainable by the previously described process. According to an embodiment, the fibrous material with antimicrobial properties is obtained by the disclosed process.

The fibrous material with antimicrobial properties obtainable by the previously described process, comprises antimicrobial properties against bacteria, fungi and viruses, particularly against *Staphylococcus aureus* and *Aspergillus brasiliensis*.

Furthermore, the fibrous material with antimicrobial properties possesses long-lasting antimicrobial properties, and the fibrous material with antimicrobial properties maintains its antimicrobial properties for at least 10 washes in wet cleaning.

In an embodiment, the fibrous material with antimicrobial properties is saturated with antimicrobial agent with rate 0.15-0.5 g/m$^2$, preferably 0.3-0.37 g/m$^2$.

The fibrous material with antimicrobial properties comprises at least 100-200 ppm (0.01%-0.02%) of coniferous resin acid composition.

The fibrous antimicrobial product is free of compounds that are harmful to the environment and/or animals. Thus, the fibrous material with antimicrobial properties does not cause allergies or irritation to the skin.

In an embodiment, the fibrous material with antimicrobial properties comprises aqueous composition of coniferous resin acids that form a molecular net on the fibrous material covering the fibres.

Moreover, the fibrous material with antimicrobial properties can be stored and packaged in premises where the humidity and temperatures are favorable for microbial growth.

The fibrous material with antimicrobial properties has an excellent wearability and the process for producing the fibrous material does not affect the quality characteristics of the fibrous material. On the contrary, the fibrous material with antimicrobial properties is easy to iron.

The fibrous material with antimicrobial properties is suitable for use for example in clean rooms and operating rooms/operating theatres, because it has significantly lower particle release values compared to the corresponding untreated fibrous materials as determined by quick linting test (QLT) according to the standard SFS-EN ISO 9073-10.

In an embodiment, the fibrous material with antimicrobial properties comprising coniferous resin acids has particle release of less than 300000 pcs. as determined with the QLT measurement (Quick Linting test) pursuant to standard SFS-EN ISO 9073-10.

The particle release of the fibrous material with antimicrobial properties depends on the composition of the raw material. For example, if the fibrous raw material has substantial particle release, such fibrous material treated according to the invention has even more significant particle release reduction as compared to the fibrous raw materials that have only moderate initial particle releases. For example, particle release of microfiber comprising mainly polyester (PES) is substantially larger than particle release of flex comprising a mixture of polyester, cotton and spandex. By treating such fibrous materials with the aqueous antimicrobial composition according to the invention, the particle release of the fibrous materials is substantially reduced. In an embodiment the fibrous material is microfiber consisting of about 90% of PES and about 10% of Spandex, and the particle release of the fibrous material is reduced in an amount of 40 to 100%, preferably in an amount of 50 to 90%, particularly preferably in an amount of at least 60 to 85% with the fibrous material according to the invention as compared to the untreated fibrous material as determined pursuant to standard SFS-EN ISO 9073-10.

In an embodiment the fibrous material is flex consisting about 62% PES and about 35% CO and about 10% Spandex, and the particle release of the fibrous material is reduced in an amount of 5 to 30%, preferably in an amount of 7 to 20%, particularly preferably in an amount of 10 to 15% as compared to the untreated fibrous material as determined pursuant to standard SFS-EN ISO 9073-10.

Still, in another embodiment, the fibrous material is microfiber jersey consisting about 90% PES and about 10% Spandex, and the particle release of the fibrous material is reduced in an amount of 50 to 100%, preferably in an amount of 60 to 95%, particularly preferably in an amount of 80 to 90%.

Thus, the particle release value of the fibrous material with antimicrobial properties is for most fibrous material in the range of 5 to 100% lower, preferably 10 to 90% lower, more preferably 15 to 85% lower than for the untreated fibrous material.

The particle release value of the fibrous material with antimicrobial properties is in the range of 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 and 100% reduced as compared to the original untreated fibrous material.

The particle release value of the fibrous material with antimicrobial properties is reduced as compared to control by a value that is in the range of 1 to 100%, 5 to 100%, 5 to 90%, 5 to 85%, 5 to 80%, 5 to 75%, 5 to 70%, 5 to 65%, 5 to 60%, 5 to 55%, 5 to 50%, 5 to 45%, 5 to 40%, 5 to 35%, 5 to 30%, 5 to 25%, 5 to 20%, 5 to 15%, 1 to 10%, 5 to 10%, 10 to 15%, 10 to 20%, 10 to 25%, 10 to 30%, 10 to 35%, 10 to 40%, 10 to 45%, 10 to 50%, 10 to 55%, 10 to 60%, 10 to 65%, 10 to 70%, 10 to 75%, 10 to 80%, 10 to 85%, 10 to 90%, 10 to 100%, 15 to 20%, 15 to 25%, 15 to 30%, 15 to 35%, 15 to 40%, 15 to 45%, 15 to 50%, 15 to 55%, 15 to 60%, 15 to 65%, 15 to 70%, 15 to 75%, 15 to 80%, 15 to 85%, 15 to 90%, 15 to 95%, 15 to 100%, 20 to 25%, 20 to 30%, 20 to 35%, 20 to 40%, 20 to 45%, 20 to 50%, 20 to 55%, 20 to 60%, 20 to 65%, 20 to 70%, 20 to 75%, 20 to 80%, 20 to 85%, 20 to 90%, 20 to 95%, 20 to 100%, 25 to 30%, 25 to 35%, 25 to 40%, 25 to 45%, 25 to 50%, 25 to 55%, 25 to 60%, 25 to 65%, 25 to 70%, 25 to 75%, 25 to 80%, 25 to 85%, 25 to 90%, 25 to 95%, 25 to 100%, 30 to 35%, 30 to 40%, 30 to 45%, 30 to 50%, 30 to 55%, 30 to 60%, 30 to 65%, 30 to 70%, 30 to 75%, 30 to 80%, 30 to 85%, 30 to 90%, 30 to 95%, 30 to 100%, 35 to 40%, 35 to 45%, 35 to 50%, 35 to 55%, 35 to 60%, 35 to 65%, 35 to 70%, 35 to 75%, 35 to 80%, 35 to 85%, 35 to 90%, 35 to 95%, 35 to 100%, 40 to 45%, 40 to 50%, 40 to 55%, 40 to 60%, 40 to 65%, 40 to 70%, 40 to 75%, 40 to 80%, 40 to 85%, 40 to 90%, 40 to 95%, 40 to 100%, 45 to 50%, 45 to 60%, 45 to 65%, 45 to 70%, 45 to 75%, 45 to 80%, 45 to 85%, 45 to 90%, 45 to 95%, 45 to 100%, 50 to 55%, 50 to 60%, 50 to 65%, 50 to 70%, 50 to 75%, 50 to 80%, 50 to 85%, 50 to 90%, 50 to 95%, 50 to 100%, 55 to 60%, 55 to 65%, 55 to 70%, 55 to 75%, 55 to 80%, 55 to 85%, 55 to 90%, 55 to 95%, 55 to 100%, 60 to 65%, 60 to 70%, 60 to 75%, 60 to 80%, 60 to 85%, 60 to 90%, 60 to 95%, 60 to 100%, 65 to 70%, 65 to 75%, 65 to 80%, 65 to 85%, 65 to 85%, 65 to 90%, 65 to 95%, 65 to 100%, 70 to 75%, 70 to 80%, 70 to 85%, 70 to 90%, 70 to 95%, 70 to 100%, 75 to 80%, 75 to 85%, 75 to 90%, 75 to 95%, 75 to 100%, 80 to 85%, 80 to 90%, 80 to 95%, 80 to 100%, 85 to 90%, 85 to 95%, 85 to 100%, 90 to 95%, 90 to 100% and/or 95 to 100%.

One very surprising finding is that the fibrous material treated with an alcoholic resin acid composition has significantly higher particle release value as compared to the untreated fibrous material. Alcoholic resin acid composition increases the particle release value of fibrous material more than 50%. Whereas the fibrous materials treated with an aqueous resin acid composition according to the invention have significantly lower particle release values as compared to the untreated fibrous material.

In an embodiment, the fibrous material with antimicrobial properties comprising aqueous composition of coniferous resin acids has a molecular net formed by the coniferous resin acids. Thus, a fibrous material treated with an aqueous composition of coniferous resin acids is characterized in that the coniferous resin acids form a molecular net on the fibrous material covering the fibres. The molecular net is bioactive in that it has antimicrobial properties, and/or it can act as physical barrier.

Still, in an embodiment, the fibrous material with antimicrobial properties comprises a molecular net of coniferous resin acids formed on the treated surface and/or within its pores. The molecular net can act as a bioactive molecular net and as a physical barrier. The bioactive molecular net provides antimicrobial properties by immobilizing microbes and preventing their spread to surrounding areas.

In an embodiment, the particle release of the fibrous material with antimicrobial properties is reduced about 5-100%, preferable about 10-100%, more preferably about 15-85% compared to the untreated fibrous material as determined with the QLT measurement (Quick Linting test) pursuant to standard SFS-EN ISO 9073-10.

Moreover, the fibrous material with antimicrobial properties according to the invention has substantially smooth surface and an evenly distribution of coniferous resin acids as presented in FIGS. 3 and 4 showing electron micrographs obtained by electron microscope from fibrous material produced according to this disclosure. Further, in FIGS. 3 and 4, it is seen a molecular net of coniferous resin acids on the fibrous material covering the fibres.

It can be seen from FIGS. 1 and 2 that the fibrous material treated with an alcoholic resin acid composition shows small droplets that are resulting from the uneven distribution of coniferous resin acid composition. FIGS. 5 and 6 show the electron micrographs taken from the surfaces of an untreated fibrous material.

However, it is not possible to obtain the same smooth surface and an evenly distribution of coniferous resin acids as presented in FIGS. 3 and 4 with any aqueous resin acid composition. FIGS. 7 and 8 are electron micrographs showing the same fibrous original material as in FIGS. 1-6, but instead it was impregnated in the aqueous coniferous resin acid dispersion (wound spray from Repolar Pharmaceuticals) with the brand name AniDes® comprising aqua, glycerin, propanediol, caprylic/capric triglyceride, Norway spruce (*Picea abies*) resin extract, sorbitan laureate, polyglycerol laureate, dilauryl citrate, xanthan gum, potassium sorbate, denatomium benzoate and sodium hydroxide. Following impregnation said fibrous material was properly dried although drying took a long time due to hygroscopic properties of glycerin.

The fibrous material with antimicrobial properties has strong antibacterial and fungistatic activity. In an embodiment, the fibrous material with antimicrobial properties has antimicrobial activity value of Ig 2, preferably Ig 3, more preferably Ig 5 for *Staphylococcus aureus* ATCC6538 as determined by standard method EN20743:2013.

In an embodiment, the fibrous material with antimicrobial properties has strong fungistatic activity value of ≥Ig 2, preferably ≥Ig 3, more preferably ≥Ig 5 at resin acid concentrations 100 ppm, 200 ppm or 400 ppm for *Aspergillus brasiliensis* (former *Aspergillus niger*) ATCC 16404 as determined by the standard method EVS-EN ISO 20743:2013.

In an embodiment, the fibrous material with antimicrobial properties has antibacterial and antifungal properties, wherein the antimicrobial activity value is ≥Ig 2 as determined by standard method EVS-EN ISO 20743:2013.

Still, in an embodiment, the fibrous material with antimicrobial properties has antimicrobial activity for *Staphylococcus aureus* ATCC6538 and *Aspergillus brasiliensis* ATCC16404 as determined by standard method EVS-EN ISO 20743:2013.

Further, in an embodiment the fibrous material with antimicrobial properties has antimicrobial activity value of at least ≥Ig 3 as determined by standard method EVS-EN ISO 20743:2013.

Furthermore, the disclosure relates to a fibrous material with antimicrobial properties obtainable by the previously described process and suitable for use in fabrics such as textile, clothes such as fur, canvas, tissues, webs, accessories, packaging materials, wallpapers, construction products, food-related products, household products, footwear, and medical products. Thus, the fibrous material with antimicrobial properties is suitable for use at least in fabrics, fur, leather, clothes, canvas, tissues, plastics, webs, accessories, packaging materials, wallpapers, food-related products, household products, footwear, construction materials, insulating materials and medical products.

The antimicrobial fibrous material obtainable by the process is suitable for use in many different applications. Examples of such applications include many kinds of fibrous products such as textiles, papers, clothes, yarns, fabrics (woven and non-woven as well as knitted), tissues, hairs and furs, webs, accessories, packaging materials, wallpapers, furniture, hospital textiles, cloths for protection of surgical sites, protective gloves, hair covers, aprons, wound dressings, bandages for surgical wounds and skin opening made during operations, coatings for artificial parts to be placed into the body and made of fibrous material, protective bandages, medical products such as bandages, sutures, dressing clothes, surgical yarns and dental flosses, sausage skins and other food-related applications, construction materials, insulating materials, shoes insoles and coatings thereof.

The following examples are given for further illustration of the invention without limiting the invention thereto.

EXAMPLES

Example 1 presents composition of the coniferous resin acid composition, and the manufacture of fibrous material with antimicrobial properties, as well as the ecotoxicology results of the water-soluble concentrate of coniferous resin acids. Example 1.1 presents preparation of the water-soluble concentrate for fabrics saturation and manufacture of fibrous material with antimicrobial properties. Example 1.2 presents preparation of the water-soluble concentrate for fabrics saturation and manufacture of fibrous material with antimicrobial properties according to the second embodiment. Example 1.3 presents results from the ecotoxicology studies of the water-soluble concentrate of coniferous resin acids. Example 2 presents the wash resistance properties of the fibrous material with antimicrobial properties and the antimicrobial activity of the fibrous material as determined before and after washes. Also, physical properties of the fibrous material with antimicrobial properties are presented as compared to the original untreated fibrous material. Example 2.1 presents the effect of repeated washings to antimicrobial properties of the fibrous material with antimicrobial properties obtained from example 1.1, and in example 2.2 is shown the effect of repeated washings on the antimicrobial properties of the fibrous material obtained from example 1.2., and further in example 2.3 is shown the physical properties of treated fibrous materials as compared to the physical properties of untreated fibrous materials. Example 3 is a comparative example; wherein fibrous material was immersed in an alcohol-based solution (example 3.1) and water-based solution (example 3.2) comprising coniferous resin acid composition and the antibacterial activity was determined after washes. Example 4 presents fibrous material with antimicrobial properties, wherein said fibrous material consists of PVDF and it is intended for use as fibrous raw material in the manufacturing of surgical yarns, suture materials and/or surgical meshes. Example 5 presents the fibrous material with antimicrobial properties, wherein said fibrous material consisted of polypropylene (PP) and it was intended for use in the manufacture of non-woven surgical masks and/or clothing. Example 6 presents the particle release of fibrous material with antimicrobial properties as compared to the original untreated fibrous material. Example 7 presents a comparative example, wherein particle releases of three differently treated fibrous materials were compared.

Example 1

The rosin acid composition of coniferous resin acid composition obtained by distilling crude tall oil derived from Kraft pulping process of wood was analysed by gas chromatography according to standard method ASTM D5974. As shown in table 1 the rosin acid composition of the coniferous resin acid composition consists mainly of abietic acid, but there are also significant amounts of pimaric acid, palustric acid, dehydroabietic acid and neoabietic acid. For example, following ratios can be calculated from table 1 values: the ratio of pimaric acid to palustric acid is 1:1.1, palustric acid to abietic acid is 1:6.4, dehydroabietic acid to abietic acid is 1:8.4, neoabietic acid to abietic acid is 1:7, neoabietic acid to palustric acid is 1:1.1, pimaric acid to abietic acid is 1:7.

TABLE 1

Rosin acid composition of the coniferous resin acid composition

| Rosin acid composition | Weight-% |
|---|---|
| Secodehydroabietic 1 8,15-Isopimaradien-18-oic acid | 0.2 |
| Secodehydroabietic acid 2 8,15-pimaric acid | 0.1 |
| Pimaric acid | 6.3 |
| Sandaracopimaric acid | 1.4 |
| Dihydroabietics acid (group) | 1.2 |
| Levopimaric acid | 0.2 |
| Palustric acid | 7.0 |
| 7,9 (11)-abietic acid | 0.0 |
| Isopimaric acid | 1.0 |
| 13-B-7,9 (11)-abietic acid | 0.1 |
| 8,12-abietic acid | 0.7 |
| Abietic acid | 44.7 |
| Dehydroabietic acid | 5.3 |
| Neoabietic acid | 6.4 |
| Dehydrodehydroabietic acid | 0.3 |
| Nordehydroabietic acid | |
| Unknown rosin acids | 4.0 |
| Rosin acids, total | 78.7 |
| Non eluting compounds | 20.9 |

In addition to rosin acids shown in table 1, the coniferous resin acid composition comprised also about 20.9 w-% of non-eluting compounds.

The unsaponifiable matter of the coniferous resin acid composition was analysed according to standard method ASTM D1965. The coniferous resin acid composition comprised about 3.4% of unsaponifiable matter.

The coniferous resin acid composition was further analysed for its fatty acid composition. The coniferous resin acid composition consisted only minor amount of fatty acids, namely 0.1 weight-% of anteiso-heptadecanoic acid and 0.2 weight-% of unknown fatty acids.

Example 1.1

In this example the water-soluble concentrate of coniferous resin acid composition was prepared with C14/C16-alpha olefin sulphonate sodium salt 38% CAS 68439-57-6 as emulsifier and ethylene glycol monobutyl ether CAS 111-76-2 as solvent. Ethylene glycol monobutyl ether was chosen as suitable solvent because it has equal balance of hydrophobic and hydrophilic character, and it is one of the fastest evaporating glycol ethers. C14/C16-alpha olefin sulphonate sodium salt was chosen as suitable emulsifier because it has low tackiness residual and outstanding wetting properties.

Preparation of the Water-Soluble Concentrate

The water-soluble concentrate of the active agent was manufactured by first determining the solubility of the antimicrobial agent in ethylene glycol monobutyl ether (CAS-111-76-2). It was found that 10% of antimicrobial agent can be dissolved in 90% of ethylene glycol monobutyl ether solvent for 30 minutes at room temperature and atmospheric pressure. For the preparation of water-soluble concentrate 0.1 kg of coniferous resin acid composition was mixed with predetermined amount (0.9 kg) of solvent ethylene glycol monobutyl ether and complete dissolution was observed within 30 minutes. The thus formed solution had a yellow colour and it was homogenous, transparent and slightly turbid. In parallel, an aqueous 38 weight-% solution of the emulsifier C14/16-alpha olefin sulphonate sodium salt was prepared by mixing at room temperature for 3 minutes. The resulting solution had a yellow colour, it was homogeneous, transparent and bright. Thereafter, for preparing the finished product, 200 ml of first solution comprising the active agent was mixed with 530 ml of said aqueous emulsifier solution and 270 ml of water for 5 minutes and allowed to settle for 10 minutes to remove air bubbles. All operations were performed at room temperature of around 20° C. and atmospheric pressure. The weight proportions of the coniferous resin acid composition, solvent, emulsifier solution and water used in the preparation of the water-soluble concentrate are shown in table 2.

TABLE 2

Weight proportions of the compounds in the water-soluble concentrate

| Active agent weight-% | Ethylene glycol monobutyl ether weight-% | 38% C14/16-alpha olefin sulphonate sodium salt solution weight-% | Water weight-% |
| --- | --- | --- | --- |
| 2 | 18 | 53 | 27 |

The thus manufactured water-soluble concentrate of the coniferous resin acid composition had an appearance of yellow liquid with specific solvent odour, density of 1.02 kg/l and pH 5.5 (measured in 1:10 water solution). The content of the active agent in the water-soluble concentrate was 2%. The water-soluble concentrate was used to prepare stable aqueous working solutions with concentration ratio from 1:200 and higher.

Manufacture of Fibrous Material with Antimicrobial Properties

The fibrous material with antimicrobial properties was manufactured as follows: Fabric made from natural fibers (100% cotton) having a size of 63×100 mm, weight—0.4 g (according to the terms of EN20743:2013) was chosen. A working solution containing 0.02% (200 ppm) of the coniferous resin acid composition was prepared by diluting the water-soluble concentrate with water in a ratio of 1:100. It was estimated that if in the process the coniferous resin acid composition gets washed out supposedly by 50%, the residual concentration 0.01% (100 ppm) of the coniferous resin acid composition will be sufficient to impart bactericidal properties. Fabric was dipped into the working solution until completely wet. Wetting process occurred immediately due to the presence of the emulsifier C14/16-alpha olefin sulphonate sodium salt in the solution. Soaked fabric was allowed to drain and weighted to monitor working solution consumption. Then fabric was laid on a metal surface and placed in a thermostat at 37° C. for drying. Drying was carried out for 120 minutes until complete drying of fabric. This ensured complete removal of the solvent ethylene glycol monobutyl ether from fabric structure to neutralize the hydrophilic active substance bonds.

Once fully dried, fabric was washed in running water until no foaming occurred. Absence of the foam indicated complete removal of emulsifier C14/16-alpha olefin sulphonate sodium salt from fabric. Finally, the washed fabric was laid on a metal surface and placed in a thermostat at 37° C. for drying. Drying was carried out for 120 minutes until the fabric was completely dry. Drying temperature of 37° C. was chosen, because it provided good conditions for microbial growth.

After drying the treated fabric was compared with an untreated control sample. Fabrics organoleptic properties and colour were identical as compared to the control sample.

Consumption of the working solution was 1.15 g/0.00063 m² of fabric=1.825 kg/1 m² of fabric. The thus manufactured fibrous material with antimicrobial properties was saturated with coniferous resin acid composition with rate of 0.3-0.365 g/m² fabric.

Example 1.2

This example presents another embodiment, wherein the water-soluble concentrate of coniferous resin acid composition was prepared with ethoxylated oleamine as emulsifier and alkylamine oxide as wetting agent and ethanolamine as pH regulator. The thus manufactured aqueous solution of emulsified coniferous resin acid composition was then transferred into fibrous material by impregnation, and finally the fibrous material was after-treated to form a finished product, i.e. the fibrous material with antimicrobial properties.

Preparation of the Water-Soluble Concentrate

For the preparation of water-soluble concentrate, 20 g of coniferous resin acid composition was mixed with 110 g of isopropyl alcohol and complete dissolution was observed within 60 minutes. Then 5 g of pH regulator ethanol amine was added, and the mixture was stirred for 5 minutes. 15 g of ethoxylated oleamine emulsifier was added and the resulting mixture was stirred for 5 minutes. 100 g of wetting agent alkylamine oxide was then added and stirred for 15 minutes to remove air bubbles that formed during hydrolysis of IPA. All operations were performed at room temperature 20° C. and at atmospheric pressure. Afterwards 750 ml of distilled water was added gradually and stirred for 15 minutes. The resulting solution had a yellow colour, it was homogeneous, transparent and bright.

The weight proportions of the coniferous resin acid composition, solvent, emulsifier solution and water used in the preparation of the water-soluble concentrate are shown in table 3.

The water-soluble concentrate of the coniferous resin acid composition had an appearance of yellow liquid, odour of specific alcohol, pH 8.5 (of the working solution 1:100) and density of 0.95 kg/m³.

TABLE 3

Weight proportions of the compounds in the water-soluble concentrate

| Coniferous resin acid composition weight-% | Solvent Isopropyl alcohol weight-% | pH regulator Ethano-lamine weight-% | Emulsifier Oleamine ethoxylated weight-% | Wetting agent Alkyl-amine oxide 30% weight-% | Water weight-% |
| --- | --- | --- | --- | --- | --- |
| 2 | 11 | 0.5 | 1.5 | 10 | 75 |

Manufacture of Fibrous Material with Antimicrobial Properties

The fibrous material with antimicrobial properties was prepared by choosing a fabric from mixed material of natural and artificial fibres (polyester 62%, cotton 35%, spandex 3%). Size of the fabric was 45×60 mm, weight 0.6 g. A working solution containing 0.02% (200 ppm) of the active agent was prepared by diluting the water-soluble concentrate with water in a ratio of 1:100. Fabric was dipped into the working solution until completely wet. Wetting process occurred immediately due to the presence of wetting agent in the solution. Soaked fabric was allowed to drain and weighed to monitor the consumption of the working solution. Then fabric was laid on a metal surface and placed in a thermostat at 37° C. for drying. Drying was carried out for 120 minutes until the fabric was completely dry. This ensured complete removal of the solvent isopropanol from fabric structure.

To eliminate possible effect of auxiliary components during bactericidal activity trials, fully dried fabric was washed in running water until no foaming occurred. Absence of the foam indicated complete removal of surfactants from fabric. Then the washed fabric was laid on a metal surface and placed in a thermostat at 37° C. for drying. Drying was carried out for 120 minutes until the fabric was completely dry. After drying the treated fabric was compared with an untreated control sample. Organoleptic properties and the colour of the fabric were identical as compared to the control sample. Consumption of the working solution was 0.2 g/0.00027 $m^2$ of fabric, which corresponds to 0.74 kg/$m^2$ of fabric. Thus, the obtained fibrous material with antimicrobial properties was saturated with coniferous resin acid composition with rate 0.1-0.15 g/$m^2$, and the total content of auxiliary components in the fabric structure was 0.25-0.375 g/$m^2$.

The resulting fibrous material with antimicrobial properties was smooth, and the electron micrographs showed an evenly distribution of the coniferous resin acids. Coniferous resin acids formed a molecular net covering the fibres in the fibrous material.

Example 1.3

This example presents results from the ecotoxicology studies of the water-soluble concentrate (as presented in example 1.2). The preparation of the said water-soluble concentrate used in these studies is shown in example 1.2.

Acute Aquatic Toxicity and Long-Term Adverse Effects

The ecotoxicology test was performed in an accredited laboratory in accordance to table 4, and test results and tested microbes are presented in table 5.

Acute Toxicology and Long-Term Adverse Effects

TABLE 4

| Ecotoxicology of antimicrobial concentrate | | | |
|---|---|---|---|
| Substance | | Classification of product | |
| Classification | N, R51-53/H411-H413 | N, R51-53/H411-H413 | N, R52-53/H412-H413 |
| N, R50-53/H411-H413 | Concentration ≥ 25% | 2.5% ≤ Concentration < 25% | 0.25% ≤ Concentration < 2.5% |
| N, R51-53/H411-H413 | — | Concentration ≥ 25% | 2.5% ≤ Concentration < 25% |
| R52-53/H412-H413 | — | — | Concentration ≥ 25% |

Provisions for hazardousness:
H410: Very toxic to aquatic organisms with long-term harmful effects
H411: Toxic to aquatic life with long lasting harmful effects
H412: Harmful to aquatic organisms with long-lasting effects
H413: May cause long-term adverse effects on aquatic organisms Estimation of Toxicity The toxicity was estimated according to the following classification:

LC50/EC50 (mg/l) Category
<1 Very toxic
1-10 Moderately toxic
10-100 Slightly toxic

TABLE 5

| Test results from ecotoxicology studies of an aqueous antimicrobial concentrate | | | |
|---|---|---|---|
| Test method | Microbe | Concentration of aqueous antimicrobial concentrate | Amount of aqueous concentrate mg/l |
| | | 100% | |
| 24 h/SFS-EN ISO 6341: 2012, OECD 202: 1984 | Daphnia magna | | 3500 |
| SFS-EN 11348-3: 1999 | Luminescent bacteria | | 690 |
| SFS-EN ISO 8692-2012 | Green algae Pseudokirchnerilla subcapitata | | 600 |
| | | 10-30% working solution | |
| 24 h/SFS-EN ISO 6341: 2012, OECD 202: 1984 | Daphnia magna | | 11700-35000 |
| SFS-EN 11348-3: 1999 | Luminescent bacteria | | 2300-6900 |
| 0-72 h/Algatoxkit F SFS-EN ISO 8692-2012 | Green algae Pseudokirchnerilla subcapitata | | 2000-6000 |

As presented in table 5, the results clearly show that the antimicrobial concentrate is non-toxic to the environment. Furthermore, also the working solution (diluted aqueous concentrate) is non-toxic to the environment.

Example 2

This example presents the wash resistance properties of the fibrous material with antimicrobial properties and the antibacterial activity of the fibrous material as determined before and after washes.

Bactericidal Properties of the Fibrous Material with Antimicrobial Properties

Example 2.1 presents the effect of repeated washings to antimicrobial properties of the fibrous material with antimicrobial properties obtained from example 1.1 as determined by standard method EN20743:2013. Also, fungistatic activity of fibrous material impregnated with water soluble solution of coniferous resin acid composition obtained from example 1.1 is presented. In example 2.2 is shown the effect of repeated washings on the antimicrobial properties of the fibrous material with antimicrobial properties obtained from example 1.2. Further, in example 2.3 is shown the physical properties of treated fibrous material as compared to the physical properties of untreated fibrous material.

Example 2.1

Antimicrobial Properties

The bactericidal properties of the fibrous material produced in example 1.1. were determined by standard method EN20743:2013. A bacterial model *Staphylococcus aureus* ATCC 6538 was chosen and the test was carried out in triplicate in Petri dishes, where a test sample of fabric was placed. Microbial suspension was applied to the fabric according to the method. For control the microbial solution was also applied to fabric samples, that had not been treated with coniferous resin acid composition. Microbial suspension was maintained on the fabric during 23.5±0.5 hours. The subsequent procedure was carried out in accordance with the test method SFS-EN ISO 20743.

The fabric treated with coniferous resin acid composition in an amount of 0.3-0.365 g/m² had sustained strong bactericidal activity against *Staphylococcus aureus* ATCC 6538 and showed more than 7 exponents reduce of bacterial growth compared to the untreated sample (in terms of EN20743:2013).

The antibacterial activity of the impregnated cotton was Ig 7.2 without washes and Ig 5.2 after 10 washes. Table 6 illustrates the growth of *Staphylococcus aureus* ATCC 6538 in control samples, table 7 illustrates the growth of *Staphylococcus aureus* ATCC 6538 in freshly impregnated textile, and table 6 illustrates a summary of the test for freshly impregnated textile. The same formulas and abbreviations were used as in the following examples.

TABLE 6

Control for freshly impregnated textile (24 h)

| Test organism | Dilution rate 10 | Specimen 1 | Specimen 2 | Specimen 3 |
|---|---|---|---|---|
| *Staphylococcus aureus* ATCC 6538 | −7 | >300/>300 | >300/>300 | >300/>300 |
| | −8 | >300/>300 | >300/>300 | >300/>300 |
| | −9 | >300/>300 | >300/>300 | >300/>300 |
| | −10 | 30/45 | 80/90 | 50/40 |

TABLE 7

Test for freshly impregnated textile (24 h)

| Test organism | Dilution rate 10 | Specimen 1 | Specimen 2 | Specimen 3 |
|---|---|---|---|---|
| *Staphylococcus aureus* ATCC 6538 | 1 | >300/>300 | >300/>300 | >300/>300 |
| | −1 | >300/>300 | >300/>300 | >300/>300 |
| | −2 | 300/280 | 270/290 | 300/285 |
| | −3 | 9/11 | 14/17 | 3/2 |
| | −4 | 0/0 | 0/0 | 0/0 |

TABLE 8

Test for freshly impregnated textile

*Staphylococcus aureus* ATCC6538

| | |
|---|---|
| Concentration of inoculums (CFU/ml) | 0.2 ml-4.9 Ig CFU/ml (To, Co) |
| Difference of extremes for three control specimens (Ig) (condition: less than 1 Ig) | 0 h — 23 ± 0.5 h<br>0.2 — 0.3 |
| Difference of extremes for three antibacterial testing specimens (Ig) (condition: less than 2 Ig) | 0 h — 23 ± 0.5 h<br>0.2 — 0.7 |
| Growth value of F (F = Ig Ct − Ig Co) | +8.0 (12.9 − 4.9 = 8.0) |
| Growth value of G (G = Ig Tt − Ig To) | +0.86 (5.76 − 4.9 = 0.86) |
| Antibacterial activity value (A = F − G) | Ig 7.24 (8.0 − 0.86 = 7.24) |
| Measuring method | Plate count method |
| Type of sample textile | Fabric (100% CO) |
| Sterilization method | UV |
| Incubation time | 23 ± 0.5 h |

Sustainability of the Bactericidal Properties of the Fabric

This example illustrates the wash resistance properties of impregnated fabric obtained from example 1.1.

Table 9 illustrates the growth of *Staphylococcus aureus* ATCC 6538 in ten times laundered control samples, table 10 illustrates the growth of *Staphylococcus aureus* ATCC 6538 in ten times laundered impregnated textile, and table 11 illustrates a summary of the test for ten times laundered impregnated textile. The same formulas and abbreviations were used as in the previous examples.

TABLE 9

Control for ten times laundered impregnated textile (24 h)

| Test organism | Dilution rate 10 | Specimen 1 | Specimen 2 | Specimen 3 |
|---|---|---|---|---|
| *Staphylococcus aureus* ATCC 6538 | −6 | >300/>300 | >300/>300 | >300/>300 |
| | −7 | 190/210 | 205/225 | 250/230 |
| | −8 | | | |
| | −9 | 10/20 | 17/13 | 11/16 |
| | −10 | 0/1<br>0/0 | 2/2<br>0/0 | 3/1<br>0/0 |

TABLE 10

Test for ten times laundered impregnated textile (24 h)

| Test organism | Dilution rate 10 | Specimen 1 | Specimen 2 | Specimen 3 |
|---|---|---|---|---|
| *Staphylococcus aureus* ATCC 6538 | 1 | >300/>300 | >300/>300 | >300/>300 |
| | −1 | >300/>300 | >300/>300 | >300/>300 |
| | −2 | 300/280 | 270/290 | 300/285 |
| | −3 | 9/11 | 14/17 | 3/2 |
| | −4 | 0/0 | 0/0 | 0/0 |

TABLE 11

Test for ten times laundered impregnated textile

*Staphylococcus aureus* ATCC6538

| | |
|---|---|
| Concentration of inoculums (CFU/ml) | 0.2 ml (4.48 Ig CFU/ml) (To, Co) |
| Difference of extremes for three control specimens (Ig) (condition: less than 1 Ig) | 0 h — 23 ± 0.5 h<br>0.1 — 0.1 |
| Difference of extremes for three antibacterial testing specimens (Ig) (condition: less than 2 Ig) | 0 h — 23 ± 0.5 h<br>0.1 — 0.7 |
| Growth value of F (F = Ig Ct − Ig Co) | +5.98 (10.46 − 4.48 = +5.98) |
| Growth value of G (G = Ig Tt − Ig To) | +0.79 (5.27 − 4.48 = 0.79) |
| Antibacterial activity value (A = F − G) | Ig 5.19 (5.98 − 0.79 = 5.19) |
| Measuring method | Plate count method |
| Type of sample textile | Fabric (Cotton 100%) |
| Sterilization method | UV |
| Incubation time | 23 ± 0.5 h |

Fungistatic Activity

A red coloured fabric from mixed fibres (Polyester 62%, cotton 35%, spandex 3%), size 63×100 mm, weight 0.6 g, was chosen as a model. Control suite contained 0.6 g samples of intact textile and test suite contained three 0.6 g samples of impregnated textile. *Aspergillus brasiliensis* (former *Aspergillus niger*) ATCC 16404 was taken as a microbiological model.

Fabric was dipped into the working solution until completely wet. Soaked fabric was allowed to drain and then it was laid on a metal surface and placed in a thermostat at 37° C. for drying. Drying was carried out for 120 minutes until complete drying of fabric. Finally, all fabric surfaces were sterilized in UV rays for 1.5 hours on each side.

The fabric was treated with working solutions of the following concentrations of 2% water-soluble concentrate of coniferous resin acid composition:

| Concentration | Dilution ratio |
| --- | --- |
| 0.04% (400 ppm) | 1:50 |
| 0.02% (200 ppm) | 1:100 |
| 0.01% (100 ppm) | 1:200 |
| 0.005% (50 ppm) | 1:400 |

Each fabric sample was placed into sterile Petri dish and 0.2 ml *Aspergillus* spore suspension ($3 \times 10^4$ cfu/ml) was introduced on the surface. The suspension was left to soak into fabric surface for 2-3 minutes. After this 20 ml of Tryptone Physiological Saline (0.85% NaCl and 0.2% Polysorbate 80) was carefully introduced into each Petri dish without contacting fabric surfaces. All dishes were marked and incubated at 30° C. for 30 days.

*Aspergillus* hyphae growth appeared in control samples at $2^{nd}$ day of incubation; at $5^{th}$ day *Aspergillus* black spore forms appeared. In concentration 0.005% (50 ppm) during 21 days after contact visible growth appeared, i.e. *Aspergillus* black colonies on fabric surface. Visible growth of *Aspergillus* in concentrations of 0.02% (200 ppm), 0.01% (100 ppm) and 0.04% (400 ppm) was absent during all incubation time. Table 12 presents the growth of *Aspergillus brasiliensis* ATCC 16404 in control samples and table 13 presents the growth of *Aspergillus brasiliensis* ATCC 16404 in test for impregnated textile.

TABLE 12

Control for impregnated textile (30 days)

| Test organisms | Dilution rate R 10 | Control specimen CFU/ml |
| --- | --- | --- |
| *Aspergillus* | −6 | 220/230 |
| *brasiliensis* | −7 | 37/29 |
| ATCC | −8 | 3/3 |
| 16404 | −9 | 1/1 |
|  | −10 | 1/0 |

TABLE 13

Test for impregnated textile (30 days)

| Test organism | Dilution rate R | Test specimen with concentration 400 ppm (CFU/ml) | Test specimen with concentration 200 ppm (CFU/ml) | Test specimen with concentration 100 ppm (CFU/ml) | Test specimen with concentration 50 ppm (CFU/ml) |
| --- | --- | --- | --- | --- | --- |
| *Aspergillus* | 1 | 300/300 | 300/300 | 300/300 | >300/>300 |
| *brasiliensis* | −1 | 22/16 | 35/27 | 30/37 | >300/>300 |
| ATCC | −2 | 1/3 | 3/3 | 2/3 | >300/>300 |
| 16404 | −3 | 0/0 | 0/0 | 0/0 | >300/>300 |
|  | −4 | 0/0 | 0/0 | 0/0 | >300/>300 |
|  | −5 | 0/0 | 0/0 | 0/0 | 75/67 |
|  | −6 | 0/0 | 0/0 | 0/0 | 10/8 |
|  | −7 | 0/0 | 0/0 | 0/0 | 2/3 |

In accordance with EVS-EN ISO 20743:2013 in the modification, the coniferous resin acid composition at concentrations 100 ppm, 200 ppm and 400 ppm in impregnated textile possesses strong fungistatic activity in the 30 days contact time at 29.5° C.±0.5° C. (>5 Ig) for referenced strain *Aspergillus brasiliensis* (former *Aspergillus niger*) ATCC 16404. A summary of the test for impregnated textile is presented in table 14. The following formulas and abbreviations were used in the calculation:

$$M = C_B \times 20;$$

$$C_B = Z \times R;$$

M is the number of fungi per specimen;
$C_B$ is the fungi concentration, in CFU/ml;
Z is the average value of Petri dishes in CFU/ml of inoculum;
R is the dilution rate;
CFU is the colony-forming units;
F is the growth value on the control specimen;
Ig Ct is the common logarithm of arithmetic average of the numbers of fungi obtained from control specimen after incubation of 30 days;
Ig Co is the common logarithm of arithmetic average of the numbers of fungi obtained from control specimen immediately after inoculation;
A is the fungistatic activity value;
G is the growth value on the antifungal testing specimen;
Ig Tt is the common logarithm of arithmetic average of the numbers of fungi obtained from antifungal testing specimen after 18 days incubation;
Ig To is the common logarithm of arithmetic average of the numbers of fungi obtained from antifungal testing specimen immediately after inoculation.

TABLE 14

Test for impregnated textile

| | *Aspergillus brasiliensis* ATCC 16404 | |
| --- | --- | --- |
| Concentration of inoculums (CFU/ml and Ig) | $7.5 \times 10^3$ | 3.88 Ig |
| Growth value of F (F = Ig Ct − Ig Co) | +5.33 (9.21 − 3.88 = 5.33) | |
| Growth value of G (G = Ig Tt − Ig To) | 400 ppm | −0.28 (3.6 − 3.88 = −0.28) |
| | 200 ppm | −0.08 (3.8 − 3.88 = −0.08) |
| | 100 ppm | −0.08 (3.8 − 3.88 = −0.08) |
| | 50 ppm | +4.27 (8.15 − 3.88 = 4.27) |
| Fungistatic activity value (A = F − G) | 400 ppm | Ig 5.61 (5.33 − −0.28 = 5.61) |
| | 200 ppm | Ig 5.41 (5.33 − −0.08 = 5.41) |
| | 100 ppm | Ig 5.41 (5.33 − −0.08 = 5.41) |
| | 50 ppm | Ig 1.06 (5.33 − 4.27 = 1.06) |

TABLE 14-continued

Test for impregnated textile

*Aspergillus brasiliensis* ATCC 16404

| | |
|---|---|
| Measuring method | Plate count method |
| Type of sample material | Textile (polyester 62%, cotton 35%, spandex 3%) |
| Sterilization method | UV |
| Incubation time | 30 days |

Concurrently greater dilution ratios of 1:600 and 1:800 of the coniferous resin acid composition were researched. Product activity was not observed. In control, visible growth of *Aspergillus* black colonies appeared at $5^{th}$ day of contact time.

A summary of the test results presented in table 14 show that strong fungistatic activity was achieved already at concentration of 100 ppm of the coniferous resin acid composition, and at greater concentrations i.e. 200 ppm, and 400 ppm the fungistatic activity value was very similar to that achieved with smaller 100 ppm concentration of the coniferous resin acid composition. Thus, a conclusion can be drawn that coniferous resin acid composition at concentration of 100 ppm is sufficient to provide strong fungistatic activity into fibrous materials, such as textiles.

Fungicidal Properties of Piled Up Fabric

Concurrently fungicidal properties of fabric in a package were researched. The fabric was treated with the following concentrations of 2% water-soluble concentrate of coniferous resin acid composition:

| | Dilution ratio |
|---|---|
| 0.08% (800 ppm) | 1:25; |
| 0.04% (400 ppm) | 1:50; |
| 0.02% (200 ppm) | 1:100. |

At first, test and control specimens were sterilized by UV (for 1.5 hour each side). 4 fabric pieces of the same sample were successively put into sterile Petri dish, 0.05 ml of the inoculum (spore suspension $3 \times 10^4$ cfu/ml) was accurately pipetted at several points on each test specimen. Each test specimen (layer) was inoculated one by one. Then four test specimens (layers) were placed (stacked) in one plate (Petri dish) with one concentration. Immediately after the inoculation 20 ml of tryptone sodium chloride solution was added into each plate and the plate was closed. Then plates were mixed carefully and slowly by hand. The plates were incubated (control specimen and three testing specimens: 200 ppm, 400 ppm and 800 ppm) at 29.5° C.±0.5° C. for 18 days.

The growth of the test organism *Aspergillus brasiliensis* ATCC 16404 in control samples is presented in table 15 and corresponding results for impregnated textile at three concentration levels (200, 400 and 800 ppm) are shown in table 16.

TABLE 15

Control for impregnated textile (18 days)

| Test organism | Dilution rate R | Control specimen CFU/ml |
|---|---|---|
| *Aspergillus* | −6 | >300/300 |
| *brasiliensis* | −7 | >300/>300 |
| ATCC 16404 | −8 | 68/72 |
| | −9 | 7/6 |
| | −10 | 2/1 |

TABLE 16

Test for impregnated textile (18 days)

| Test organism | Dilution rate R | Test specimen with concentration 800 ppm | Test specimen with concentration 400 ppm | Test specimen with concentration 200 ppm |
|---|---|---|---|---|
| *Aspergillus* | 1 | 110/120 | 138/125 | 135/143 |
| *brasiliensis* | 1 | 12/12 | 14/13 | 13/15 |
| ATCC 16404 | −2 | 0/1 | 1/2 | 1/0 |
| | −3 | 0/0 | 0/0 | 0/0 |
| | −4 | 0/0 | 0/0 | 0/0 |

A summary of the test for impregnated textile is presented in table 17. The same formulas and abbreviations were used as in the previous example of fungistatic activity. In accordance with EVS-EN ISO 20743:2013 in the modification, the 2% concentrate of coniferous resin acid composition at concentrations 200 ppm, 400 ppm and 800 ppm (v/v) in impregnated textile possesses strong fungistatic activity (>7 Ig) in the 18 days contact time at 29.5±0.5 00 for referenced strain *Aspergillus brasiliensis* (former *Aspergillus niger*).

TABLE 17

Test for impregnated textile

*Aspergillus brasiliensis* ATCC 16404

| | | |
|---|---|---|
| Concentration of inoculums (CFU/0.2 ml and Ig) | $5.5 \times 10^3$ | 3.74 Ig |
| Concentration of inoculums (CFU/0.05 ml and Ig) | $1.35 \times 10^3$ | 3.13 Ig |
| Growth value of F (F = Ig Ct − Ig Co) | +7.36 (11.1 − 3.74 = 7.36) | |
| Growth value of G (G = Ig Tt − Ig To) | 800 ppm | −0.38 (3.36 − 3.74 = −0.38) |
| | 400 ppm | −0.32 (3.42 − 3.74 = −0.32) |
| | 200 ppm | −0.30 (3.44 − 3.74 = −0.3) |
| Fungistatic activity value (A = F − G) | 800 ppm | Ig 7.74 (7.36 − −0.38 = 7.74) |
| | 400 ppm | Ig 7.68 (7.36 − −0.32 = 7.68) |
| | 200 ppm | Ig 7.66 (7.36 − −0.30 = 7.66) |
| Measuring method | Plate count method | |
| Type of sample material | Textile (polyester 62%, cotton 35%, spandex 3%) | |
| Sterilization method | UV | |
| Incubation time | 18 days | |

The results clearly illustrate that fabric treated with 0.15-0.3 $g/m^2$ of coniferous resin acid composition gains a stable fungistatic activity against *Aspergillus brasiliensis* (former *Aspergillus niger*) ATCC 16404, inhibiting spore development into vegetative forms and consequent reproduction of fungi. Coniferous resin acid composition can be used as an antifungal preservative for prevention of mold biodegradation of fabric products in high humidity environment. Furthermore, if the thus treated fabric pieces are piled up their antifungal properties are maintained.

Example 2.2

Below is shown the effect of repeated washings on the antimicrobial properties of the fibrous material with antimicrobial properties obtained by the process described in example 1.2.

Antimicrobial Properties

The bactericidal properties of the fibrous material produced in example 1.2 were determined by standard method EN20743:2013. A bacterial model *Staphylococcus aureus* ATCC 6538 was chosen and the test was carried out in triplicate in Petri dishes, where a test sample of fabric was placed. 0.2 ml of microbial suspension was applied to the fabric according to the method. Each suite contained three samples of 0.4 grams of intact fabric and three samples of 0.4 grams of impregnated fabric (polyester 62%, cotton 35%, spandex 3%) and three samples of 0.4 grams of impregnated fabric (polyester 62%, cotton 35%, spandex 3%) laundered and dried by 10 times. For control the microbial

TABLE 18

Control for freshly impregnated textile (24 h)

| Test organism | Dilution rate 10 | Specimen 1 | Specimen 2 | Specimen 3 |
|---|---|---|---|---|
| Staphylococcus aureus ATCC 6538 | −7 | >300/>300 | >300/>300 | >300/>300 |
| | −8 | 55/68 | 27/39 | 40/32 |
| | −9 | 0/0 | 0/0 | 0/0 |
| | −10 | 0/0 | 0/0 | 0/0 |

TABLE 19

Test for freshly impregnated textile (24 h)

| Test organism | Dilution rate 10 | Specimen 1 | Specimen 2 | Specimen 3 |
|---|---|---|---|---|
| Staphylococcus aureus ATCC 6538 | 1 | >300/>300 | >300/>300 | >300/>300 |
| | −1 | >300/>300 | >300/>300 | >300/>300 |
| | −2 | >300/>300 | >300/>300 | >300/>300 |
| | −3 | >300/>300 | >300/>300 | >300/>300 |
| | −4 | 74/86 | 49/36 | 55/68 |
| | −5 | 14/19 | 9/4 | 3/6 |
| | −6 | 0/0 | 0/0 | 0/0 |

TABLE 20

Test for freshly impregnated textile

| | Staphylococcus aureus ATCC6538 |
|---|---|
| Concentration of inoculums (CFU/ml) | 0.2 ml-4.88 lg CFU /ml (To, Co) |
| Difference of extremes for three control specimens (lg) (condition: less than 1 lg) | 0 h  23 ± 0.5 h <0.1  0.27 |
| Difference of extremes for three antibacterial testing specimens (lg) (condition: less than 2 lg) | 0 h  23 ± 0.5 h <0.1  0.58 |
| Growth value of F (F = lg Ct − lg Co) | +6.05 (10.93 − 4.88 = +6.05) |
| Growth value of G (G = lg Tt − lg To) | +2.2 (7.08 − 4.88 = 2.2) |
| Antibacterial activity value (A = F − G) | lg 3.85 (6.05 − 2.2 = 3.85) |
| Measuring method | Plate count method |
| Type of sample textile | Fabric (polyester 62%, cotton 35%, spandex 3%) |
| Sterilization method | UV |
| Incubation time | 23 ± 0.5 h |

Consequently, it can be seen that the fabric treated with coniferous resin acid composition in an amount of 0.15/m² had sustained strong bactericidal activity against *Staphylococcus aureus* ATCC 6538 showing more than 3 exponents reduction of bacterial growth compared to the untreated sample (in terms of EN20743: 2013).

Sustainability of the Bactericidal Properties of the Fabric

This example illustrates the wash resistance properties of impregnated fabric obtained from example 1.2. It was contemplated that since the main auxiliary substance that fixates coniferous resin acid composition in water solution is a complex of non-ionic surfactants, it was found necessary to determine the effect of detergents, containing non-ionic surfactants, on washing out the coniferous resin acid composition from fabric structure.

The fabric treated with coniferous resin acid composition according to example 1.2 was taken as a model fabric and Tween 80, as a product that is used in scientific research for neutralization of chemical biocides, was selected as a model of non-ionic surfactant. Working solution of the detergent was prepared by weighing 2.5 g Tween 80/1 litre of water at temperature of 40° C.

Surfactant solution was poured into the flask and placed on a magnetic stirrer with a heating temperature of 30° C. Three samples of fabric were placed were placed in the solution and rotated in a detergent solution at 40 rpm for 15 minutes. Thus, a combined mechanical action and the impact of detergent on the test sample of fabric was simulated. After the procedure the fabric samples were laid out on a metal surface and placed in a thermostat at 37° C. for drying. Drying was carried out for 120 minutes until complete drying of the fabric. In total 10 full cycles were carried out simulating a complete cycle of washing, which consisted of mechanical impact and the detergent effect, rinsing and drying.

The samples were then tested for bactericidal properties and the tests were carried out as previously shown and in accordance with the method EN20743:2013.

Table 21 illustrates the growth of *Staphylococcus aureus* ATCC 6538 in ten times laundered control samples, table 22 illustrates the growth of *Staphylococcus aureus* ATCC 6538 in ten times laundered impregnated textile, and table 23 illustrates a summary of the test for ten times laundered impregnated textile. The same formulas and abbreviations were used as in the previous examples.

TABLE 21

Control for ten times laundered impregnated textile (24 h)

| Test organism | Dilution rate 10 | Specimen 1 | Specimen 2 | Specimen 3 |
|---|---|---|---|---|
| Staphylococcus aureus ATCC 6538 | −7 | >300/>300 | >300/>300 | >300/>300 |
| | −8 | 55/68 | 27/39 | 40/32 |
| | −9 | 0/0 | 0/0 | 0/0 |
| | −10 | 0/0 | 0/0 | 0/0 |

TABLE 22

Test for ten times laundered impregnated textile (24 h)

| Test organism | Dilution rate 10 | Specimen 1 | Specimen 2 | Specimen 3 |
|---|---|---|---|---|
| Staphylococcus aureus ATCC 6538 | 1 | >300/>300 | >300/>300 | >300/>300 |
| | −1 | >300/>300 | >300/>300 | >300/>300 |
| | −2 | >300/>300 | >300/>300 | >300/>300 |
| | −3 | >300/>300 | >300/>300 | >300/>300 |
| | −4 | >100/>100 | >100/>100 | >100/>100 |
| | −5 | 27/15 | 17/25 | 32/27 |
| | −6 | 0/0 | 0/0 | 0/0 |

TABLE 23

Test for ten times laundered impregnated textile

| | Staphylococcus aureus ATCC6538 |
|---|---|
| Concentration of inoculums (CFU/ml) | |
| Difference of extremes for three control specimens (lg) (condition: less than 1 lg) | 0 h  23 ± 0.5 h <0.1  0.27 |
| Difference of extremes for three antibacterial testing specimens (lg) (condition: less than 2 lg) | 0 h  23 ± 0.5 h <0.1  0.15 |

TABLE 23-continued

Test for ten times laundered impregnated textile

| | Staphylococcus aureus ATCC6538 |
|---|---|
| Growth value of F (F = lg Ct − lg Co) | +6.05 (10.93 − 4.88 = +6.05) |
| Growth value of G (G = lg Tt − lg To) | +2.8 (7.68 − 4.88 = 2.8) |
| Antibacterial activity value (A = F − G) | lg 3.25 (6.05 − 2.8 = 3.25) |
| Measuring method | Plate count method |
| Type of sample textile | Fabric (polyester 62%, cotton 35%, spandex 3%) |
| Sterilization method | UV |
| Incubation time | 23 ± 0.5 h |

According to the results presented in tables 21-23, the fabric treated with the coniferous resin acid composition in an amount of 0.15 g/m² after 10 washing cycles with neutralizer Tween 80, has sustained strong bactericidal activity against *Staphylococcus aureus* ATCC6538, showing more than 3 exponents reduce of bacterial growth as compared to untreated sample (in terms of EN20743: 2013).

Example 2.3

In example 2.3 is shown the physical properties of treated fibrous materials as compared to the physical properties of untreated fibrous materials.

The physical properties of fibrous material with antimicrobial properties

Table 24 presents the physiological properties of fibrous material treated with an aqueous resin acid composition according to the invention.

TABLE 24

Physiological properties of fibrous materials

| Tested product Property | Untreated original fibrous material | Fibrous material treated with an aqueous resin acid composition |
|---|---|---|
| 62% PES, 35% CO, 3% EL | | |
| Determination of pilling | 3-4 | 3-4 |
| Abrasion resistance (rubs) | 44000 | 44000 |
| Color fastness to domestic and commercial laundering | Change in color 4-5 | Change in color 4-5 |
| Color fastness to perspiration Alkaline/Acid | Change in color 4-5/4-5 | Change in color 4-5 |
| Color fastness to rubbing, Warp | Dry 4-5/wet 4 | Dry 4-5%/wet 4 |
| Color fastness to rubbing, Weft | Dry 4-5/wet 4 | Dry 4-5%/wet 4 |
| Determination of wringle recovery/Wringling/Recovery | 2-3/3-4 | 2-3/3-4 |
| 90% PES, 10% EL | | |
| Determination of pilling | 5 | 5 |
| Abrasion resistance (rubs) | 87000 | 89000 |
| Color fastness to domestic and commercial laundering | Change in color 4-5 | Change in color 4-5 |
| Color fastness to perspiration Alkaline/Acid | Change in color 4-5/4-5 | Change in color 4-5/4-5 |
| Color fastness to rubbing, Wrap | Dry 4-5/wet 4-5 | Dry 4-5/wet 4-5 |
| Color fastness to rubbing, Weft | Dry 4-5/wet 4-5 | Dry 4-4/wet 4-5 |
| Determination of maximum force and elongation | Warp 995 N/62.9 %, Weft 1040 N/56.7 % | Warp 1025 N/65.7 %, Weft 1050 N/ 58.3 % |
| Determination of resistance to surface wetting, Specimen 1-3 | 0/0/0 | 0/0/0 |
| Determination of wringle recovery/Wringling/Recovery | 4/5 | 3-4/5 |
| 100% Cotton | | |
| Determination of pilling | 3-5 | 3-5 |
| Abrasion resistance (rubs) | 20000 | 17000 |
| Color fastness to domestic and commercial laundering | Change in color 4-5 | Change in color 4-5 |
| Color fastness to perspiration Alkaline/Acid | Change in color 4-5/4-5 | Change in color 4-5/4-5 |
| Color fastness to rubbing, Wrap | Dry 4-5/wet 4 | Dry 4-5/wet 4 |
| Color fastness to rubbing, Weft | Dry 4-5/wet 4 | Dry 4-4/wet 4 |
| Determination of maximum force and elongation | Warp 652 N/6.8%, Weft 544 N/18% | Warp 649 N/6.8%, Weft 534 N/22.5% |
| Determination of resistance to surface wetting, Specimen 1-3 | 1/0 /0 | 1/1/1 |
| Determination of wringle recovery/Wringling/Recovery | 1-2/2 | 1-2/2 |

As seen from table 24, the fibrous material with antimicrobial properties has about the same physiological properties as the original untreated fibrous material. Thus, producing fibrous material with an aqueous resin acid composition do not adversely affect on physical properties of the resulting fibrous products. Treating fibrous materials with an aqueous resin acid composition according to the disclosed process has no effect on physical properties of the products.

Example 3

This comparative example shows the antimicrobial properties of fibrous material impregnated with an alcohol-based coniferous resin acid composition as well as with a water-based coniferous resin acid composition. Details of these studies are presented in examples 3.1 and 3.2.

Example 3.1

This example presents results of experiments wherein fibrous material was immersed in an alcohol-based solution comprising coniferous resin acid composition and the antibacterial activity was determined before and after washes according to the same SFS-EN ISO 20743 method as previously used. Said alcohol based coniferous resin acid solution did not contain emulsifiers or wetting agents. However, as it is known that the antimicrobial properties of the coniferous resin acid composition are enhanced by quaternary ammonium compounds, a small amount of quaternary ammonium compounds were added to the composition.

Composition of the Alcohol-Based Coniferous Resin Acid Solution

An alcohol-based coniferous resin acid composition solution was prepared. The solution consisted of 70-80% of ethanol, ≤0.03% of quaternary ammonium compounds, <1% of coniferous resin acid composition and water.

Antimicrobial Properties of the Fibrous Material Impregnated with an Alcohol-Based Coniferous Resin Acid Solution The test was performed with three different fabric materials and antimicrobial activity was determined after 10 washes. Table 25 presents test results for sport socks. Corresponding results for sport textile and tricot knitting are presented in tables 26 and 27, respectively. None of the tested materials showed long-lasting antimicrobial properties and the results clearly show that impregnation with an alcohol-based solution is not sufficient to bind the coniferous resin acid composition into fibrous material.

TABLE 25

Test results for determination of antimicrobial properties of sport socks after 10 washes

| Test bacteria | Staphylococcus aureus ATCC6538 | |
| --- | --- | --- |
| Concentration of inoculums (CFU/ml) | $2.25 \times 10^5$ | |
| Difference of extremes for three control | 0 h | 24 h |
| specimens (lg) (condition: less than 1 lg) | 0.1 | 0.5 |
| Difference of extremes three | 0 h | 24 h |
| antibacterial testing specimens (lg) | | |
| (condition: less than 2 lg) | 0.7 | 0.9 |
| Growth value of F (F = lg Ct − lg Co) | +1.8 | |
| Growth value of G (G = lg Tt − lg To) | +1.1 | |
| Antibacterial activity value (A = F − G) | lg 0.7 | |
| Measuring method | Plate count method | |
| Type of sample textile | Sport socks, black (79% CO, 15% PES, 2% PA, 2% Spandex, 2% Rubber) | |
| Sterilization method | Sterilization in autoclave | |
| Incubation time | 24 h | |
| Efficacy of antibacterial property | Lower than the grades given in the standard* | |

*Efficacy of antibacterial property was defined according to standard by using following grading system: 2 ≤ A < 3 Significant, A ≥ 3 Strong. The standard does not give the grade for the results lower than 2.

TABLE 26

Test results for determination of antimicrobial properties of sport textile after 10 washes

| Test bacteria | Staphylococcus aureus ATCC6538 | |
| --- | --- | --- |
| Concentration of inoculums (CFU/ml) | $2.25 \times 10^5$ | |
| Difference of extremes for three control | 0 h | 24 h |
| specimens (lg) (condition: less than 1 lg) | 0.4 | 0.2 |
| Difference of extremes for three | 0 h | 24 h |
| antibacterial testing specimens (lg) | 0.3 | 0.5 |
| (condition: less than 2 lg) | | |
| Growth value of F (F = lg Ct − lg Co) | +2.2 | |
| Growth value of G (G = lg Tt − lg To) | +1.8 | |
| Antibacterial activity value (A = F − G) | lg 0.4 | |
| Measuring method | Plate count method | |
| Type of sample textile | Sport textile, (100% PES) | |
| Sterilization method | Sterilization in autoclave | |
| Incubation time | 24 h | |
| Efficacy of antibacterial property | Lower than the grades given in the standard* | |

*Efficacy of antibacterial property was defined according to standard by using following grading system: 2 ≤ A < 3 Significant, A ≥ 3 Strong. The standard does not give the grade for the results lower than 2.

TABLE 27

Test results for determination of antimicrobial properties of tricot knitting after 10 washes

| Test bacteria | Staphylococcus aureus ATCC6538 | |
|---|---|---|
| Concentration of inoculums (CFU/ml) | $2.25 \times 10^5$ | |
| Difference of extremes for three control | 0 h | 24 h |
| specimens (lg) (condition: less than 1 lg) | 0.0 | 0.7 |
| Difference of extremes for three | 0 h | 24 h |
| antibacterial testing specimens (lg) | | |
| (condition: less than 2 lg) | 0.0 | 0.9 |
| Growth value of F (F = lg Ct − lg Co) | +1.7 | |
| Growth value of G (G = lg Tt − lg To) | +1.2 | |
| Antibacterial activity value (A = F − G) | lg 0.5 | |
| Measuring method | Plate count method | |
| Type of sample textile | Tricot knitting (100% CO) | |
| Sterilization method | Sterilization in autoclave | |
| Incubation time | 24 h | |
| Efficacy of antibacterial property | Lower than the grades given in the standard* | |

*Efficacy of antibacterial property was defined according to standard by using following grading system: 2 ≤ A < 3 Significant, A ≥ 3 Strong. The standard does not give the grade for the results lower than 2.

The results clearly show that it is not possible to obtain long-lasting antibacterial properties of the fibrous material by impregnation with alcohol-based coniferous resin acid solution.

Example 3.2

This example presents results of experiments wherein fibrous material was immersed in water-based solution comprising coniferous resin acid composition and the antibacterial activity was determined after 10 washes according to the same SFS-EN ISO 20743 method as previously used. Said water-based coniferous resin acid solution did not contain emulsifiers or wetting agents. However, as it is known that the antimicrobial properties of the coniferous resin acid composition are enhanced by quaternary ammonium compounds, a small amount of quaternary ammonium compounds were added to the composition.

Composition of the Water-Based Coniferous Resin Acid Composition

The water-based coniferous resin acid composition was manufactured by first preparing a 30% solution of coniferous resin acid composition in alcohol and then adding this alcoholic coniferous resin acid solution into an aqueous detergent solution in an amount of about 0.9 w-%.

The resulting water-based solution consisted of ≤5% of fatty alcohol ethoxylate, ≤7% quaternary ammonium compounds, ≤2% of sodium carbonate, ≤1% of coniferous resin acid composition, water and tetrapotassium pyrophosphate as complex forming agent.

Antimicrobial Properties of the Fibrous Material Impregnated with a Water-Based Coniferous Resin Acid Solution The test was performed with three different fabric materials and antimicrobial activity was determined after 10 washes. Table 28 presents test results for sport socks. Corresponding results for sport textile and tricot knitting are presented in tables 29 and 30, respectively. None of the tested materials showed long-lasting antimicrobial properties and the results clearly show that impregnation with water-based solution is not sufficient to bind the coniferous resin acid composition into fibrous material.

TABLE 28

Test results for determination of antimicrobial properties of sport socks after 10 washes

| Test bacteria | Staphylococcus aureus ATCC6538 | |
|---|---|---|
| Concentration of inoculums (CFU/ml) | $2.25 \times 10^5$ | |
| Difference of extremes for three control | 0 h | 24 h |
| specimens (lg) (condition: less than 1 lg) | 0.1 | 0.5 |
| Difference of extremes for three | 0 h | 24 h |
| antibacterial testing specimens (lg) | 0.7 | 0.9 |
| (condition: less than 2 lg) | | |
| Growth value of F (F = lg Ct − lg Co) | +1.8 | |
| Growth value of G (G = lg Tt − lg To) | +0.9 | |
| Antibacterial activity value (A = F − G) | 0.9 | |
| Measuring method | Plate count method | |
| Type of sample textile | Sport socks, black (79% CO, 15% PES, 2% PA, 2% Spandex, 2% Rubber) | |
| Sterilization method | Sterilization in autoclave | |
| Incubation time | 24 h | |
| Efficacy of antibacterial property | Lower than the grades given in the standard* | |

*Efficacy of antibacterial property was defined according to standard by using following grading system: 2 ≤ A < 3 Significant, A ≥ 3 Strong. The standard does not give the grade for the results lower than 2.

TABLE 29

Test results for determination of antimicrobial properties of sport textile after 10 washes

| Test bacteria | *Staphylococcus aureus* ATCC6538 | |
|---|---|---|
| Concentration of inoculums (CFU/ml) | $2.25 \times 10^5$ | |
| Difference of extremes for three control specimens (lg) (condition: less than 1 lg) | 0 h<br>0.4 | 24 h<br>0.2 |
| Difference of extremes for three antibacterial testing specimens (lg) (condition: less than 2 lg) | 0 h<br>0.5 | 24 h<br>0.4 |
| Growth value of F (F = lg Ct − lg Co) | +2.2 | |
| Growth value of G (G = lg Tt − lg To) | +1.8 | |
| Antibacterial activity value (A = F − G) | 0.4 | |
| Measuring method | Plate count method | |
| Type of sample textile | Sport textile (100% PES) | |
| Sterilization method | Sterilization in autoclave | |
| Incubation time | 24 h | |
| Efficacy of antibacterial property | Lower than the grades given in the standard* | |

*Efficacy of antibacterial property was defined according to standard by using following grading system: $2 \leq A < 3$ Significant, $A \geq 3$ Strong. The standard does not give the grade for the results lower than 2.

TABLE 30

Test results for determination of antimicrobial properties of tricot knitting after 10 washes

| Test bacteria | *Staphylococcus aureus* ATCC6538 | |
|---|---|---|
| Concentration of inoculums (CFU/ml) | $2.25 \times 10^5$ | |
| Difference of extremes for three control specimens (lg) (condition: less than 1 lg) | 0 h<br>0.0 | 24 h<br>0.4 |
| Difference of extremes for three antibacterial testing specimens (lg) (condition: less than 2 lg) | 0 h<br>0.0 | 24 h<br>1.5 |
| Growth value of F (F = lg Ct − lg Co) | +1.7 | |
| Growth value of G (G = lg Tt − lg To) | +0.9 | |
| Antibacterial activity value (A = F − G) | 0.8 | |
| Measuring method | Plate count method | |
| Type of sample textile | Tricot knitting, (100% CO) | |
| Sterilization method | Sterilization in autoclave | |
| Incubation time | 24 h | |
| Efficacy of antibacterial property | Lower than the grades given in the standard* | |

*Efficacy of antibacterial property was defined according to standard by using following grading system: $2 \leq A < 3$ Significant, $A \geq 3$ Strong. The standard does not give the grade for the results lower than 2.

The results clearly show that it is not possible to obtain long-lasting antibacterial properties of the fibrous material by impregnation with water-based coniferous resin acid solution.

The results of comparative example 3 show that it is not possible to obtain long-lasting antimicrobial properties in textile products with water-based solution of coniferous resin acid composition. Furthermore, the comparative example 3 shows that neither alcohol-based solution of coniferous resin acid composition nor water-based solution of coniferous resin acid composition is sufficient to obtain long-lasting antimicrobial properties in textile products. Thus, the results show that without emulsifying the coniferous resin acid composition (step I) of the disclosed process), it is not possible to produce fibrous material with long-lasting antimicrobial properties. The results of the comparative example are even more significant and surprising, because both solutions of coniferous resin acid composition contained quaternary ammonium compounds that are known to enhance the antimicrobial properties of the coniferous resin acids.

Example 4

In this example the fibrous material consisted of PVDF and it was intended for use in the manufacture of surgical yarns, suture materials or surgical meshes. Said fibrous material is treated with an antimicrobial composition obtained by diluting the water-soluble concentrate of example 1.2 in ratio of 1:100. The antimicrobial test was performed according to standard SFS-EN ISO 20743 for *Staphylococcus aureus* ATCC 6538 and the fungistatic test was performed according to standard EVS-EN ISO 20743: 2013 for *Aspergillus brasiliensis* ATCC 16404 as in example 2.1.

The results obtained were similar to the previously presented examples for fibrous materials. The microbial activity of the surgical yarns was reduced more than three exponents as compared to the untreated surgical yarn used as control. Thus, the fibrous material had strong microbicidal and fungicidal activities.

Example 5

In this example the fibrous material consisted of polypropylene (PP) and it was intended for use in the manufacture of non-woven surgical masks and/or clothing. Said fibrous material is treated with an antimicrobial composition obtained by diluting the water-soluble concentrate of example 1.2 in ratio of 1:100. The fibrous material was impregnated into the aqueous resin acid emulsion according to previously described process as in example 1.2. The antimicrobial test was performed according to standard SFS-EN ISO 20743 for *Staphylococcus aureus* ATCC 6538 and the fungistatic test was performed according to standard EVS-EN ISO 20743:2013 for *Aspergillus brasiliensis* ATCC 16404 as in example 2.1.

The results obtained were similar to the previously presented examples for fibrous materials. The microbial activity of the surgical mask and clothing was reduced more than three exponents as compared to the untreated surgical mask and clothing used as control. Thus, the fibrous materials had strong antimicrobial and antifungal properties.

Example 6

This example presents the particle release of fibrous material with antimicrobial properties as compared to the untreated fibrous material. The aim of this example was to determine the particle release of three materials both as original (untreated) and treated with an antimicrobial composition comprising coniferous resin acids. The fibrous material with antimicrobial properties was manufactured as in example 1.2. Lint and other particle generation in the dry state was determined pursuant to standard SFS-EN ISO 9073-10 with little differences with QLT (quick linting test) device.

Example 6.1 presents the particle release of three materials both as original and treated.

Example 6.1

The treated fibrous materials were manufactured as in example 1.2 with a working solution of the water-soluble concentrate. The release of the materials was determined with the QLT measurement (Quick Linting Test). The measurements were made for the following materials (original and treated):
1. Microfiber, grey, 110 g, 90% PES—10% Spandex,
2. Flex, white, 200 g, 62% PES—35% CO—10% Spandex,
3. Microfiberjersey, black, 175-185 g, 90% PES—10% Spandex.

QLT Quick Linting Test

Lint and other particle generation in the dry state was determined pursuant to standard SFS-EN ISO 9073-10 with little differences with QLT (quick linting test) device. The sample was subjected to a combined twisting and compressing action in a test chamber.

Three parallel determinations were made on both sides (A right and B wrong) of the material. The specimen was placed over the shaft in the chamber (27 $dm^3$) of QLT measurement device. The shaft made twisting and compressing movement. During the flexing, air was withdrawn from the chamber and particulates (0.3-25 µm) in the air stream were counted and classified in a laser particle counter Hiac Royco 5230. The air of the chamber of QLT device was HEPA filtered. The particle concentration of the chamber was measured before the test and it was deducted from the results of the sample. Measurements were done in a relative humidity of (50±5) % RH and in a temperature of (23±2)° C. Particle release of the material was calculated with particle size categories so that the release of different size of particles are shown. Linting values were calculated for both sides (A and B) separately and for the material as the mean of both sides (linting of material). Total linting is a sum of all counts.

Particle Release of Materials

The release of the particles is shown in table 31 by particle size classes and in table 32 as total linting of material.

TABLE 31

Particle release of materials with QLT measurement

| Particle release of material [pcs./particle size] | Particle size distribution [µm] | | | | | | | |
|---|---|---|---|---|---|---|---|---|
| | 0.3-0.5 | 0.5-1 | 1-7 | 7-9 | 9-13 | 13-18 | 18-25 | >25 |
| Microbifer, grey, original | | | | | | | | |
| Side A | 156926 | 290739 | 751381 | 4004 | 541 | 142 | 107 | 119 |
| Side B | 179974 | 327106 | 774265 | 3762 | 602 | 165 | 148 | 194 |
| Linting of material | 168450 | 308922 | 762823 | 3883 | 572 | 153 | 128 | 157 |
| Microfiber, grey, treated | | | | | | | | |
| Side A | 15307 | 37953 | 170694 | 341 | 103 | 51 | 36 | 46 |
| Side B | 20169 | 49317 | 185119 | 382 | 126 | 66 | 76 | 111 |
| Linting of material | 17738 | 43635 | 177907 | 362 | 115 | 59 | 56 | 79 |
| Flex, white, original | | | | | | | | |
| Side A | 8725 | 10757 | 9967 | 165 | 55 | 33 | 23 | 26 |
| Side B | 10066 | 7699 | 9156 | 130 | 52 | 25 | 20 | 19 |
| Linting of material | 9396 | 9228 | 9562 | 148 | 53 | 29 | 21 | 23 |
| Flex, white, treated | | | | | | | | |
| Side A | 8890 | 7074 | 10068 | 146 | 39 | 17 | 20 | 35 |
| Side B | 7619 | 5918 | 8583 | 107 | 29 | 14 | 13 | 19 |
| Linting of material | 8255 | 6496 | 9326 | 126 | 34 | 16 | 16 | 27 |
| Microfiberjersey, black, original | | | | | | | | |
| Side A | 32929 | 57792 | 108960 | 235 | 52 | 28 | 18 | 15 |
| Side B | 18303 | 31010 | 57144 | 296 | 127 | 85 | 53 | 45 |
| Linting of material | 25616 | 44401 | 83052 | 266 | 90 | 57 | 35 | 30 |

TABLE 31-continued

Particle release of materials with QLT measurement

| Particle release of material [pcs./particle size] | Particle size distribution [μm] | | | | | | | |
|---|---|---|---|---|---|---|---|---|
| | 0.3-0.5 | 0.5-1 | 1-7 | 7-9 | 9-13 | 13-18 | 18-25 | >25 |
| Microfiberjersey, black, treated | | | | | | | | |
| Side A | 2459 | 3927 | 8443 | 94 | 49 | 28 | 28 | 29 |
| Side B | 4414 | 6910 | 17280 | 137 | 71 | 34 | 29 | 35 |
| Linting of material | 3436 | 5419 | 12862 | 115 | 60 | 31 | 29 | 32 |

TABLE 32

Total linting of materials [pcs] in particle size range of 0.3-25 μm

| Material | Total linting [pcs] | Difference original-treated/original % |
|---|---|---|
| Microbifer, grey, original | 1245088 | |
| Microfiber, grey, treated | 239949 | 81 |
| Flex, white, original | 28459 | |
| Flex, white, treated | 24296 | 15 |
| Microfiberjersey, black, original | 153547 | |
| Microfiberjersey, black, treated | 21983 | 86 |

Example 7

Example 7 presents a comparative example, wherein particle releases of three differently treated fibrous materials were compared. The example shows particle release values from untreated fibrous material, fibrous material treated as described in example 1.2, and fibrous material treated with an alcoholic resin acid composition manufactured as described in example 3.1. Detail of these studies are presented in example 7.1.

Example 7.1

The aim of this study was to determine the particle release of three materials. The release of the materials was determined with the QLT measurement (Quick Linting Test) as described in the previous example 5. The measurements were made for the following materials:
1. Red, 100% Cotton, original (untreated)
2. Red, 100% Cotton, Treated with an alcoholic resin acid composition
3. Red, 100% Cotton, Treated with an aqueous resin acid composition and manufactured as in example 1.2

QLT Quick Linting Test

The QLT measurement was performed pursuant to standard SFS-EN ISO 9073-10 as described in the previous example 6.1.

Particle Release of Materials

The release of the particles is shown in Table 33 by particle size classes and in table 34 as total linting of material.

TABLE 33

Particle release of materials with QLT measurement

| Particle release of material [pcs./particle size] | Particle size distribution [μm] | | | | | | | |
|---|---|---|---|---|---|---|---|---|
| | 0.3-0.5 | 0.5-1 | 1-2 | 2-3 | 3-5 | 5-10 | 10-25 | >25 |
| Original (untreated), red | | | | | | | | |
| Side A | 266936 | 234533 | 133723 | 116024 | 34545 | 7354 | 369 | 8600 |
| Side B | 193151 | 181800 | 107272 | 91404 | 27717 | 5753 | 281 | 138 |
| Linting of material alcoholic comp. Treated, red | 230044 | 208166 | 120498 | 103714 | 31131 | 6554 | 325 | 4369 |
| Side A | 510605 | 335112 | 169513 | 147078 | 45385 | 11066 | 359 | 206 |
| Side B | 404486 | 255813 | 122040 | 104590 | 32573 | 7894 | 270 | 160 |
| Linting of material aqueous composition acc.to invention Treated, red | 457546 | 295463 | 145777 | 125834 | 38979 | 9480 | 314 | 183 |
| Side A | 372264 | 179613 | 69155 | 54216 | 20225 | 4744 | 253 | 125 |
| Side B | 227532 | 152937 | 58054 | 44390 | 16473 | 3816 | 238 | 120 |
| Linting of material | 249898 | 166275 | 63605 | 49303 | 18349 | 4280 | 245 | 123 |

TABLE 34

Total linting of materials [pcs] in particle size range of 0.3-25 μm

| Material | Total linting [pcs] | Difference original-treated/original % |
|---|---|---|
| Original (untreated), red | 704800 | |
| alcoholic comp. Treated, red | 1073575 | −52 |
| aqueous composition acc. to invention Treated, red | 552078 | 49 |

As seen from tables 33 and 34 the fibrous material treated with an alcoholic resin acid composition has surprisingly remarkably higher total particle release value as compared to original (untreated) fibrous material and fibrous material treated with an aqueous resin acid composition according to the invention. Treatment with an alcoholic resin acid composition results in more than 50% increase in the total particle release value. Whereas treatment with an aqueous resin acid composition according to the invention results in almost 50% reduction of the total particle release value. This very surprising finding shows that fibrous products produced with different kinds of coniferous resin acid composition (i.e. alcoholic vs aqueous emulsions) have completely different product properties.

The invention claimed is:

1. A fibrous material with antimicrobial properties, comprising an emulsion of a coniferous resin acid composition in an aqueous solution with emulsifier and wetting agent, wherein
   a) the emulsifier is selected from C10-C18 alpha olefins, and the coniferous resin acid composition is first dissolved in a solvent selected from E-series glycol ethers, ethylene glycol monomethyl ether (2-methoxyethanol), ethylene glycol monoethyl ether (2-ethoxyethanol), ethylene glycol monopropyl ether (2-propoxyethanol), ethylene glycol monoisopropyl ether (2-isopropxyethanol), ethylene glycol monobutyl ether (2-butoxyethanol), ethylene glycol monophenyl ether (2-phenoxyethanol), ethylene glycol monobenzyl ether (2-benzyloxyethanol), diethylene glycol monomethyl ether (2-(2-methoxyethoxy)ethanol, methyl carbitol), diethylene glycol monoethyl ether (2-(2-ethoxyethoxy) ethanol, carbitol cellosolve), diethylene glycol mono-n-butyl ether (2-(2-butoxyethoxy)ethanol, butyl carbitol), P-series glycol ethers, dipropylene glycol methyl ether, dipropylene glycol methyl ether acetate, dipropylene glycol n-butyl ether, dipropylene glycol n-propyl ether, propylene glycol diacetate, propylene glycol methyl ether, propylene glycol methyl ether acetate, propylene glycol n-butyl ether, propylene glycol n-propyl ether, propylene glycol phenyl ether, tripropylene glycol methyl ether, tripropylene glycol n-butyl ether, dipropylene glycol dimethyl ether or mixtures thereof, or
   b) the emulsifier is selected from ethoxylated aliphatic amines having a degree of ethoxylation ranging from 2 to 15 moles, and the coniferous resin acid composition is first dissolved in isopropanol,
   wherein the emulsion comprises coniferous resin acids in an amount of 4000 ppm to 40000 ppm, and
   in a) the amount of emulsifier is 30 w-% to 70 w-% and the amount of solvent is 10 w-% to 30 w-%, or
   in b) the amount of emulsifier is 0.5 w-% to 5 w-% and the amount of isopropanol is 8 w-% to 15 w-%.

2. The fibrous material with antimicrobial properties according to claim 1, wherein the emulsifier serves as both an emulsifier and a wetting agent.

3. The fibrous material with antimicrobial properties according to claim 1, wherein the wetting agent is selected from amine oxides.

4. The fibrous material with antimicrobial properties according to claim 1, wherein the emulsion further comprises a pH regulator.

5. The fibrous material with antimicrobial properties according to claim 1, wherein the fibrous material is selected from animal, plant, mineral or synthetic fibres and/or mixtures thereof.

6. The fibrous material according to claim 1, wherein the coniferous resin acid composition comprises at least 70-80 wt-% of resin/rosin acids, of which >90 wt-% are free resin/rosin acids.

7. The fibrous material according to claim 1, wherein the emulsifier in a) is selected from C12-C16 alpha olefins.

8. An aqueous antimicrobial composition for use as a water-soluble concentrate in the treatment of fibrous materials, wherein the composition comprises an emulsion of a coniferous resin acid composition in an aqueous solution with emulsifier and wetting agent, wherein
   a) the emulsifier is selected from C10-C18 alpha olefins, and the coniferous resin acid composition is first dissolved in a solvent selected from E-series glycol ethers, ethylene glycol monomethyl ether (2-methoxyethanol), ethylene glycol monoethyl ether (2-ethoxyethanol), ethylene glycol monopropyl ether (2-propoxyethanol), ethylene glycol monoisopropyl ether (2-isopropxyethanol), ethylene glycol monobutyl ether (2-butoxyethanol, ethylene glycol monophenyl ether (2-phenoxyethanol), ethylene glycol monobenzyl ether (2-benzyloxyethanol), diethylene glycol monomethyl ether (2-(2-methoxyethoxy)ethanol, methyl carbitol), diethylene glycol monoethyl ether (2-(2-ethoxyethoxy) ethanol, carbitol cellosolve), diethylene glycol mono-n-butyl ether (2-(2-butoxyethoxy)ethanol, butyl carbitol, P-series glycol ethers, dipropylene glycol methyl ether, dipropylene glycol methyl ether acetate, dipropylene glycol n-butyl ether, dipropylene glycol n-propyl ether, propylene glycol diacetate, propylene glycol methyl ether, propylene glycol methyl ether acetate, propylene glycol n-butyl ether, propylene glycol n-propyl ether, propylene glycol phenyl ether, tripropylene glycol methyl ether, tripropylene glycol n-butyl ether, dipropylene glycol dimethyl ether or mixtures thereof, or
   b) the emulsifier is selected from ethoxylated aliphatic amines having a degree of ethoxylation ranging from 2 to 15 moles, and the coniferous resin acid composition is first dissolved in isopropanol,
   wherein the emulsion comprises coniferous resin acids in an amount of 4000 ppm to 40000 ppm, and
   in a) the amount of emulsifier is 30 w-% to 70 w-% and the amount of solvent is 10 w-% to 30 w-%, or
   in b) the amount of emulsifier is 0.5 w-% to 5 w-% and the amount of isopropanol is 8 w-% to 15 w-%.

9. The aqueous antimicrobial composition according to claim 8, wherein said composition further comprises pH regulator.

10. The aqueous antimicrobial composition according to claim 8, wherein the wetting agent is selected from amine oxides.

11. The aqueous antimicrobial composition according to claim 9, wherein the pH regulator is selected from ethanolamine, diethanolamine and triethanolamine and/or mixtures thereof.

12. The aqueous antimicrobial composition according to claim 8, wherein the coniferous resin acid composition comprises at least 70-80 wt-% of resin/rosin acids, of which >90 wt-% are free resin/rosin acids.

13. The aqueous antimicrobial composition according to claim 8, wherein the emulsifier server as both an emulsifier and a wetting agent.

14. The aqueous antimicrobial composition according to claim 8, wherein the emulsifier in a) is selected from C12-C16 alpha olefins.

* * * * *